US011362707B2

(12) United States Patent
Jin et al.

(10) Patent No.: US 11,362,707 B2
(45) Date of Patent: Jun. 14, 2022

(54) PRECODING VECTOR INDICATING AND DETERMINING METHOD AND COMMUNICATIONS APPARATUS

(71) Applicant: HUAWEI TECHNOLOGIES CO., LTD., Guangdong (CN)

(72) Inventors: Huangping Jin, Shanghai (CN); Xiaohan Wang, Shanghai (CN); Xiaoyan Bi, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/369,513

(22) Filed: Jul. 7, 2021

(65) Prior Publication Data
US 2021/0336665 A1 Oct. 28, 2021

Related U.S. Application Data

(63) Continuation of application No. PCT/CN2019/128635, filed on Dec. 26, 2019.

(30) Foreign Application Priority Data

Jan. 11, 2019 (CN) ......................... 201910028187.9

(51) Int. Cl.
*H04B 7/02* (2018.01)
*H04B 7/0456* (2017.01)

(52) U.S. Cl.
CPC .................. *H04B 7/0456* (2013.01)

(58) Field of Classification Search
CPC ...... H04B 7/0456; H04B 7/10; H04B 7/0634; H04B 7/0413

(Continued)

(56) References Cited

U.S. PATENT DOCUMENTS 8,644,289 B2 * 2/2014 Zhu ..................... H04W 52/365
370/344
8,755,451 B2 * 6/2014 Jung .................... H04B 7/0621
375/267

(Continued)

FOREIGN PATENT DOCUMENTS

CN 102223212 A 10/2011
CN 102291222 A 12/2011

(Continued)

OTHER PUBLICATIONS

Motorola Mobility / Lenovo, "Type II CSI overhead reduction," 3GPP TSG RAN1#95, R1-1813357, Spokane, China, Nov. 12-16, 2018, 8 pages.

(Continued)

*Primary Examiner* — Helene E Tayong
(74) *Attorney, Agent, or Firm* — Fish & Richardson P.C.

(57) ABSTRACT

The present disclosure relates to precoding vector indicating and determining methods and communications apparatus. In one example method, a terminal device generates first indication information, and sends the first indication information to a network device. The first indication information is used to indicate one or more frequency domain vectors and one or more weighting coefficients, where the one or more frequency domain vectors include a frequency domain vector reported for each of R frequency domain unit groups, the one or more weighting coefficients include a weighting coefficient reported for each of the R frequency domain unit groups, and a frequency domain vector and a weighting coefficient that are reported for an $r^{th}$ frequency domain unit group in the R frequency domain unit groups are used to construct a precoding vector corresponding to one or more frequency domain units in the $r^{th}$ frequency domain unit group.

20 Claims, 4 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 9,312,937 | B2* | 4/2016 | Ko | ................. H04B 7/0417 |
| 2012/0121034 | A1 | 5/2012 | Murakami et al. | |
| 2015/0349916 | A1 | 12/2015 | Murakami et al. | |
| 2016/0142117 | A1* | 5/2016 | Rahman | ............... H04B 7/0469 |
| | | | | 375/267 |
| 2017/0302353 | A1* | 10/2017 | Rahman | ............... H04B 7/0486 |

FOREIGN PATENT DOCUMENTS

| | | |
|---|---|---|
| CN | 103580738 A | 2/2014 |
| CN | 103780332 A | 5/2014 |
| CN | 106603136 A | 4/2017 |
| CN | 107211296 A | 9/2017 |
| CN | 107294578 A | 10/2017 |
| CN | 107733494 A | 2/2018 |
| CN | 107888269 A | 4/2018 |
| CN | 108322243 A | 7/2018 |
| CN | 108809391 A | 11/2018 |
| WO | 2015108636 A2 | 7/2015 |

OTHER PUBLICATIONS

Office Action issued in Chinese Application No. 201910028187.9 dated Aug. 31, 2021, 11 pages (with English translation).

PCT International Search Report and Written Opinion in International Application No. PCT/CN2019/128635, dated Mar. 3, 2020, 15 pages.

Ericsson, "On CSI enhancements for MU-MIMO support," 3GPP TSG-RAN WG1 Meeting #95, R1-1813270, Spokane, USA, Nov. 12-16, 2018, 10 pages.

Extended European Search Report issued in European Application No. 19908114.2 dated Feb. 2, 2022, 12 pages.

Huawei, HiSilicon, "Discussion on CSI enhancement," 3GPP TSG RAN WGI Meeting #95, R1-1812242, Spokane, USA, Nov. 12-16, 2018, 8 pages.

Samsung, "CSI enhancement for MU-MIMO," 3GPP TSG RAN WG1 Meeting #95, R1-1813001, Spokane, USA, Nov. 12-16, 2018, 6 pages.

Samsung, "Summary of CSI enhancement for MU-MIMO support," 3GPP TSG RAN WG1 Meeting #95, R1-1813002, Spokane, USA, Nov. 12-16, 2018, 10 pages.

Huawei, HiSilicon, "Delay reduction for SCell Activation," 3GPP TSG-RAN WG2 Meeting #99bis, R2-1711641, Prague, Czech Republic, Oct. 9-13, 2017, 4 pages.

LG Electronics Inc, "Fallback to normal CQI reporting period," 3GPP TSG-RAN2 Meeting #102 R2-1807952, Busan, Korea, May 21-25, 2018, 2 pages.

Nokia, Nokia Shanghai Bell, "Running CR for euCA Stage-2," 3GPP TSG-RAN WG2 Meeting #101, R2-1806788, Sanya, China, Apr. 16-20, 2018, 9 pages.

Office Action issued in Indian Application No. 202147032411 dated Mar. 11, 2022, 9 pages.

Office Action issued in Chinese Application No. 201910028187.9 dated Mar. 18, 2022, 4 pages.

* cited by examiner

PRECODING VECTOR INDICATING AND DETERMINING METHOD AND COMMUNICATIONS APPARATUS

CROSS-REFERENCE TO RELATED APPLICATIONS

This application is a continuation of International Application No. PCT/CN2019/128635, filed on Dec. 26, 2019, which claims priority to Chinese Patent Application No. 201910028187.9, filed on Jan. 11, 2019. The disclosures of the aforementioned applications are hereby incorporated by reference in their entireties.

TECHNICAL FIELD

This application relates to the communications field, and more specifically, to a precoding vector indicating and determining method and a communications apparatus.

BACKGROUND

In a massive multiple-input multiple-output (Massive MIMO) technology, on a network device, interference between a plurality of users and interference between a plurality of signal flows of a same user may be reduced by using a precoding technology, to improve signal quality, implement spatial multiplexing, and improve spectrum utilization.

For example, a terminal device may determine a precoding vector in a manner such as channel measurement, and expects to enable, through feedback, the network device to obtain a precoding vector that is the same as or close to the precoding vector determined by the terminal device. To reduce feedback overheads and improve feedback precision, in an implementation, the terminal device may indicate the precoding vector to the network device in a feedback manner combining spatial domain compression and frequency domain compression. Specifically, the terminal device may select one or more spatial domain vectors and one or more frequency domain vectors based on a precoding vector of each frequency domain unit at each transport layer, to fit, by using a weighted sum of a matrix constructed by using the spatial domain vector and the frequency domain vector, the precoding vector corresponding to each frequency domain unit at each transport layer.

However, this implementation may not bring about relatively high feedback precision.

SUMMARY

This application provides a precoding vector indicating and determining method and a communications apparatus, to achieve relatively high feedback precision in a case of equivalent overheads.

According to a first aspect, a precoding vector indicating method is provided. The method may be performed by a terminal device, or may be performed by a chip configured in the terminal device.

Specifically, the method includes: sending first indication information, where the first indication information is used to indicate one or more frequency domain vectors and one or more weighting coefficients, the one or more frequency domain vectors include a frequency domain vector reported for each of R frequency domain unit groups, the one or more weighting coefficients include a weighting coefficient reported for each of the R frequency domain unit groups, a frequency domain vector and a weighting coefficient that are reported for an $r^{th}$ frequency domain unit group in the R frequency domain unit groups are used to construct a precoding vector corresponding to one or more frequency domain units in the $r^{th}$ frequency domain unit, each of the R frequency domain unit groups includes one or more frequency domain units, $1 \leq r \leq R$, $R \geq 2$, and both r and R are integers; and sending the first indication information.

In this embodiment of this application, frequency domain units in a reporting bandwidth are grouped, and dual-domain compression is performed for each frequency domain unit group, to obtain frequency domain vectors and weighting coefficients that are respectively to be reported for a plurality of frequency domain unit groups. The frequency domain unit groups are grouped and the frequency domain vector is determined based on each frequency domain unit group, so that the terminal device can construct, by using the frequency domain vector adapted to each frequency domain unit group, a precoding vector corresponding to the frequency domain unit group. For example, frequency domain vectors with different lengths are selected to correspond to different frequency domain unit groups. Therefore, the terminal device can determine a proper frequency domain vector based on a quantity of frequency domain units for which reporting is to be performed in each frequency domain unit group and a distribution of the frequency domain unit in the frequency domain unit group, so that the determined frequency domain vector better reflects a change law of a channel in frequency domain, to help to achieve relatively high feedback precision, and achieve higher efficiency of a compromise between feedback overheads and feedback precision.

In contrast, if dual-domain compression is performed based on the entire reporting bandwidth, the terminal device needs to use frequency domain vectors with a same length to simulate a change law of a channel in frequency domain. In some cases, a distribution, of a frequency domain unit for which reporting is to be performed, in the reporting bandwidth may be discontinuous, or a quantity of frequency domain units for which reporting is to be performed is relatively small. If compression is performed by using a set of frequency domain vectors with a length the same as the quantity of frequency domain units for which reporting is to be performed, an obtained frequency domain vector cannot accurately reflect a change law of a channel in frequency domain due to poor continuity of the frequency domain unit for which reporting is to be performed. If compression is performed by using a frequency domain vector the same as the entire reporting bandwidth, relatively high overheads may be caused. Therefore, according to the preceding vector indicating and determining method provided in this application, relatively high feedback precision can be achieved in a case of equivalent overheads.

With reference to the first aspect, in some implementations of the first aspect, the method further includes: receiving second indication information, where the second indication information is used to indicate a quantity of to-be-reported frequency domain vectors that is configured for each of the R frequency domain unit groups.

In an implementation, a network device may indicate, to the terminal device, the quantity of frequency domain vectors that need to be reported for each frequency domain unit group.

With reference to the first aspect, in some implementations of the first aspect, the method further includes: sending fourth indication information, where the fourth indication information is used to indicate a quantity of frequency domain vectors reported for each of the R frequency domain unit groups.

In another implementation, the terminal device itself may determine the quantity of frequency domain vectors to be reported for each frequency domain unit group, and report, to the network device, the quantity of frequency domain vectors reported for each frequency domain unit group.

The fourth indication information and the first indication information may be carried in same signaling, for example, in different fields in the same signaling, or may be carried in different signaling. This is not limited in this application.

With reference to the first aspect, in some implementations of the first aspect, the method further includes: receiving fifth indication information, where the fifth indication information is used to indicate a sum of quantities of to-be-reported frequency domain vectors that is configured for the R frequency domain unit groups.

When the terminal device itself determines the quantity of frequency domain vectors to be reported for each frequency domain unit group, the network device may indicate, to the terminal device in advance, the total quantity of frequency domain vectors that need to be reported for the R frequency domain unit groups, so that the terminal device itself determines, based on the total quantity configured by the network device, the quantity of frequency domain vectors to be reported for each frequency domain unit group.

With reference to the first aspect, in some implementations of the first aspect, the method further includes: receiving third indication information, where the third indication information is used to indicate a quantity of to-be-reported weighting coefficients that is configured for each of the R frequency domain unit groups.

In an implementation, the network device may indicate, to the terminal device, the quantity of weighting coefficients that need to be reported for each frequency domain unit group.

The third indication information and the second indication information may be carried in same signaling, for example, in different fields in the same signaling, or may be carried in different signaling. This is not limited in this application.

With reference to the first aspect, in some implementations of the first aspect, the method further includes: sending sixth indication information, where the sixth indication information is used to indicate a quantity of weighting coefficients reported for each of the R frequency domain unit groups.

In another implementation, the terminal device itself may determine the quantity of frequency domain vectors to be reported for each frequency domain unit group, and report, to the network device, the quantity of weighting coefficients reported for each frequency domain unit group.

It should be noted that regardless of whether the network device indicates, to the terminal device, the quantity of weighting coefficients that need to be reported or the terminal device itself determines the quantity of weighting coefficients that need to be reported, the terminal device needs to indicate, to the network device, the quantity of weighting coefficients reported for each frequency domain unit group. Because the quantity of weighting coefficients actually reported by the terminal device may be less than the preconfigured quantity of to-be-reported weighting coefficients, the terminal device needs to notify the network device of the quantity of actually reported weighting coefficients, so that the network device accurately parses the first indication information fed back by the terminal device.

The sixth indication information and the first indication information may be carried in same signaling, for example, in different fields in the same signaling, or may be carded in different signaling. This is not limited in this application.

With reference to the first aspect, in some implementations of the first aspect, the method further includes: sending seventh indication information, where the seventh indication information is used to indicate a total quantity of weighting coefficients reported for the R frequency domain unit groups.

The terminal device may notify the network device of the quantity of weighting coefficients actually reported for each frequency domain unit group, or may notify the network device of the total quantity of weighting coefficients actually reported for the R frequency domain unit groups, so that the network device accurately parses the first indication information fed back by the terminal device.

The seventh indication information and the first indication information may be carried in same signaling, for example, in different fields in the same signaling, or may be carried in different signaling. This is not limited in this application.

In addition, the terminal device may choose to send either the sixth indication information or the seventh indication information.

With reference to the first aspect, in some implementations of the first aspect, the method further includes: receiving eighth indication information, where the eighth indication information is used to indicate a sum of quantities of to-be-reported weighting coefficients that is configured for the R frequency domain unit groups.

When the terminal device itself determines the quantity of weighting coefficients that need to be reported for each frequency domain unit group, the network device may indicate, to the terminal device in advance, the total quantity of weighting coefficients that need to be reported for the R frequency domain unit groups, so that the terminal device itself determines, based on the total quantity configured by the network device, the quantity of weighting coefficients to be reported for each frequency domain unit group.

According to a second aspect, a precoding vector determining method is provided. The method may be performed by a network device, or may be performed by a chip configured in the network device.

Specifically, the method includes: receiving first indication information, where the first indication information is used to indicate one or more frequency domain vectors and one or more weighting coefficients, the one or more frequency domain vectors include a frequency domain vector reported for each of: R frequency domain unit groups, the one or more weighting coefficients include a weighting coefficient reported for each of the R frequency domain unit groups, a frequency domain vector and a weighting coefficient that are reported for an $r^{th}$ frequency domain unit group in the R frequency domain unit groups are used to construct a precoding vector corresponding to one or more frequency domain units in the $r^{th}$ frequency domain unit, each of the R frequency domain unit groups includes one or more frequency domain units, $1 \le r \le R$, $R \ge 2$, and both r and R are integers; and determining, based on the first indication information, a precoding vector corresponding to the one or more frequency domain units in each of the R frequency domain unit groups.

In this embodiment of this application, frequency domain units in a reporting bandwidth are grouped, and dual-domain compression is performed for each frequency domain unit group, to obtain frequency domain vectors and weighting coefficients that are respectively to be reported for a plurality of frequency domain unit groups. The frequency domain unit groups are grouped and the frequency domain vector is determined based on each frequency domain unit group, so that a terminal device can construct, by using the frequency domain vector adapted to each frequency domain unit group, a precoding vector corresponding to the frequency domain unit group. For example, frequency domain vectors with different lengths are selected to correspond to different frequency domain unit groups. Therefore, the terminal device can determine a proper frequency domain vector based on a quantity of frequency domain units for which reporting is to be performed in each frequency domain unit group and a distribution of the frequency domain unit in the frequency domain unit group, so that the determined frequency domain vector better reflects a change law of a channel in frequency domain, to help to achieve relatively high feedback precision, and achieve higher efficiency of a compromise between feedback overheads and feedback precision.

In contrast, if dual-domain compression is performed based on the entire reporting bandwidth, the terminal device needs to use frequency domain vectors with a same length to simulate a change law of a channel in frequency domain. In some cases, a distribution, of a frequency domain unit for which reporting is to be performed, in the reporting bandwidth may be discontinuous, or a quantity of frequency domain units for which reporting is to be performed is relatively small. If compression is performed by using a set of frequency domain vectors with a length the same as the quantity of frequency domain units for which reporting is to be performed, an obtained frequency domain vector cannot accurately reflect a change law of a channel in frequency domain due to poor continuity of the frequency domain unit for which reporting is to be performed. If compression is performed by using a frequency domain vector the same as the entire reporting bandwidth, relatively high overheads may be caused. Therefore, according to the precoding vector indicating and determining method provided in this application, relatively high feedback precision can be achieved in a case of equivalent overheads.

With reference to the second aspect, in some implementations of the second aspect, the method further includes: sending second indication information, where the second indication information is used to indicate a quantity of to-be-reported frequency domain vectors that is configured for each of the R frequency domain unit groups.

In an implementation, the network device may indicate, to the terminal device, the quantity of frequency domain vectors that need to be reported for each frequency domain unit group.

With reference to the second aspect, in some implementations of the second aspect, the method further includes: receiving fourth indication information, where the fourth indication information is used to indicate a quantity of frequency domain vectors reported for each of the R frequency domain unit groups.

In another implementation, the terminal device itself may determine the quantity of frequency domain vectors to be reported for each frequency domain unit group, and report, to the network device, the quantity of frequency domain vectors reported for each frequency domain unit group.

The fourth indication information and the first indication information may be carried in same signaling, for example, in different fields in the same signaling, or may be carried in different signaling. This is not limited in this application.

With reference to the second aspect, in some implementations of the second aspect, the method further includes: sending fifth indication information, where the fifth indication information is used to indicate a sum of quantities of to-be-reported frequency domain vectors that is configured for the R frequency domain unit groups.

When the terminal device itself determines the quantity of frequency domain vectors to be reported for each frequency domain unit group, the network device may indicate, to the terminal device in advance, the total quantity of frequency domain vectors that need to be reported for the R frequency domain unit groups, so that the terminal device itself determines, based on the total quantity configured by the network device, the quantity of frequency domain vectors to be reported for each frequency domain unit group.

With reference to the second aspect, in some implementations of the second aspect, the method further includes: sending third indication information, where the third indication information is used to indicate a quantity of to-be-reported weighting coefficients that is configured for each of the R frequency domain unit groups.

In an implementation, a network device may indicate, to the terminal device, the quantity of weighting coefficients that need to be reported for each frequency domain unit group.

The third indication information and the second indication information may be carried in same signaling, for example, in different fields in the same signaling, or may be carried in different signaling. This is not limited in this application. The method further includes: receiving sixth indication information, where the sixth indication information is used to indicate a quantity of weighting coefficients reported for each of the R frequency domain unit groups.

In another implementation, the terminal device itself may determine the quantity of frequency domain vectors to be reported for each frequency domain unit group, and report, to the network device, the quantity of weighting coefficients reported for each frequency domain unit group.

It should be noted that regardless of whether the network device indicates, to the terminal device, the quantity of weighting coefficients that need to be reported or the terminal device itself determines the quantity of weighting coefficients that need to be reported, the terminal device needs to indicate, to the network device, the quantity of weighting coefficients reported for each frequency domain unit group. Because the quantity of weighting coefficients actually reported by the terminal device may be less than the preconfigured quantity of to-be-reported weighting coefficients, the terminal device needs to notify the network device of the quantity of actually reported weighting coefficients, so that the network device accurately parses the first indication information fed back by the terminal device.

The sixth indication information and the first indication information may be carried in same signaling, for example, in different fields in the same signaling, or may be carried in different signaling. This is not limited in this application.

With reference to the second aspect, in some implementations of the second aspect, the method further includes: receiving seventh indication information, where the seventh indication information is used to indicate a total quantity of weighting coefficients reported for the R frequency domain unit groups.

The terminal device may notify the network device of the quantity of weighting coefficients actually reported for each frequency domain unit group, or may notify the network device of the total quantity of weighting coefficients actually reported for the R frequency domain unit groups, so that the network device accurately parses the first indication information fed back by the terminal device.

The seventh indication information and the first indication information may be carried in same signaling, for example, in different fields in the same signaling, or may be carried in different signaling. This is not limited in this application.

With reference to the second aspect, in some implementations of the second aspect, the method further includes: sending eighth indication information, where the eighth indication information is used to indicate a sum of quantities of to-be-reported weighting coefficients that is configured for the R frequency domain unit groups.

When the terminal device itself determines the quantity of weighting coefficients that need to be reported for each frequency domain unit group, the network device may indicate, to the terminal device in advance, the total quantity of weighting coefficients that need to be reported for the R frequency domain unit groups, so that the terminal device itself determines, based on the total quantity configured by the network device, the quantity of weighting coefficients to be reported for each frequency domain unit group.

With reference to the first aspect or the second aspect, in some implementations, the first indication information is further used to indicate a location of a space frequency vector pair corresponding to the weighting coefficient reported for each frequency domain unit group, $K_r$ weighting coefficients are reported for the $r^{th}$ frequency domain unit group, $K_r$ space frequency vector pairs corresponding to the $K_r$ weighting coefficients are selected from $L \times M_r$ space frequency vector pairs, the $L \times M_r$ space frequency vector pairs are determined based on $M_r$ frequency domain vectors reported for the $r^{th}$ frequency domain unit group and L spatial domain vectors, $M_r \geq 1$, $L \geq 1$, $K_r \leq L \times M_r$, and all of $M_r$, L, and $K_r$ are integers; and when being used to indicate the locations of the $K_r$ space frequency vector pairs, the first indication information is specifically used to indicate relative locations of the $K_r$ space frequency vector pairs in the $L \times M_r$ space frequency vector pairs.

In an implementation, the terminal device may indicate, for each frequency domain unit group, the location of the space frequency vector pair corresponding to the reported weighting coefficient. The $K_r$ space frequency vector pairs corresponding to the $K_r$ weighting coefficients are some or all space frequency vector pairs selected from the $L \times M_r$ space frequency vector pairs, and are space frequency vector pairs used for linear combination to construct a precoding vector.

That the first indication information indicates the location of the space frequency vector pair may be understood as indicating a correspondence between a weighting coefficient and both of a spatial domain vector and a frequency domain vector, so that the network device constructs the precoding vector based on the correspondence between a weighting coefficient and both of a spatial domain vector and a frequency domain vector.

With reference to the first aspect or the second aspect, in some implementations, the first indication information is alternatively used to indicate locations of space frequency vector pairs corresponding to the weighting coefficients reported for the R frequency domain unit groups, K weighting coefficients are reported for the R frequency domain unit groups, K space frequency vector pairs corresponding to the K weighting coefficients are selected from $L \times M$ space frequency vector pairs, the $L \times M$ space frequency vector pairs are determined based on M frequency domain vectors reported for the R frequency domain unit groups and L spatial domain vectors, $M \geq 1$, $L \geq 1$, $K \leq L \times M$, and all of M, L, and K are integers; and when being used to indicate the locations of the K space frequency vector pairs, the first indication information is specifically used to indicate relative locations of the K space frequency vector pairs in the $L \times M$ space frequency vector pairs.

In another implementation, the terminal device may indicate, for the R frequency domain unit groups, the locations of the space frequency vector pairs corresponding to the reported weighting coefficients. The K space frequency vector pairs corresponding to the K weighting coefficients are some or all space frequency vector pairs selected from the $L \times M$ space frequency vector pairs, and are space frequency vector pairs used for linear combination to construct precoding vectors.

When the terminal device indicates, for the R frequency domain unit groups, the locations of the space frequency vector pairs corresponding to the reported weighting coefficients, the terminal device may no longer specifically feed back the quantity of weighting coefficients reported for each frequency domain unit group, and needs to report only the total quantity of weighting coefficients reported for the R frequency domain unit groups, to help to reduce feedback overheads.

That the first indication information indicates the locations of the space frequency vector pairs may be understood as indicating correspondences between a weighting coefficient and both of a spatial domain vector and a frequency domain vector, so that the network device constructs the precoding vectors based on the correspondences between a weighting coefficient and both of a spatial domain vector and a frequency domain vector.

With reference to the first aspect or the second aspect, in some implementations, the first indication information is further used to indicate the L spatial domain vectors, a same spatial domain vector is reported for any two frequency domain unit groups in the R frequency domain unit groups, and L is an integer greater than or equal to 1.

Because frequency domain unit grouping mainly affects frequency domain vector selection, the R frequency domain unit groups may share same one or more spatial domain vectors. The R frequency domain unit groups use same L spatial domain vectors. The terminal device may indicate the L spatial domain vectors by using one field, and does not need to repeatedly perform indication for the R frequency domain unit groups for R times, to reduce feedback overheads.

According to a third aspect, a communications apparatus is provided, including modules or units configured to perform the method in the first aspect or any possible implementation of the first aspect.

According to a fourth aspect, a communications apparatus is provided, including a processor. The processor is coupled to a memory, and may be configured to execute instructions in the memory, to implement the method in the first aspect or any possible implementation of the first aspect. Optionally, the communications apparatus further includes the memory. Optionally, the communications apparatus further includes a communications interface, and the processor is coupled to the communications interface.

In an implementation, the communications apparatus is a terminal device. When the communications apparatus is a terminal device, the communications interface may be a transceiver or an input/output interface.

In another implementation, the communications apparatus is a chip configured in a terminal device. When the communications apparatus is a chip configured in a terminal device, the communications interface may be an input/output interface.

Optionally, the transceiver may be a transceiving circuit. Optionally, the input/output interface may be an input/output circuit.

According to a fifth aspect, a communications apparatus is provided, including modules or units configured to perform the method in the second aspect or any possible implementation of the second aspect.

According to a sixth aspect, a communications apparatus is provided, including a processor. The processor is coupled to a memory, and may be configured to execute instructions in the memory, to implement the method in the second aspect or any possible implementation of the second aspect. Optionally, the communications apparatus further includes the memory. Optionally, the communications apparatus further includes a communications interface, and the processor is coupled to the communications interface.

In an implementation, the communications apparatus is a network device. When the communications apparatus is a network device, the communications interface may be a transceiver or an input/output interface.

In another implementation, the communications apparatus is a chip configured in a network device. When the communications apparatus is a chip configured in a network device, the communications interface may be an input/output interface.

Optionally, the transceiver may be a transceiving circuit. Optionally, the input/output interface may be an input/output circuit.

According to a seventh aspect, a processor is provided, including an input circuit, an output circuit, and a processing circuit. The processing circuit is configured to receive a signal by using the input circuit, and transmit a signal by using the output circuit, so that the processor performs the method in the first aspect or the second aspect and any possible implementation of the first aspect or the second aspect.

In a specific implementation process, the processor may be one or more chips, the input circuit may be an input pin, the output circuit may be an output pin, and the processing circuit may be a transistor, a gate circuit, a flip-flop, various logic circuits, or the like. By way of example rather than limitation, the input signal received by the input circuit may be received and input by a receiver, the signal output by the output circuit may be output to transmitter and transmitted by the transmitter. The input circuit and the output circuit may be a same circuit, and the circuit is separately used as the input circuit and the output circuit at different moments. Specific implementations of the processor and the various circuits are not limited in this embodiment of this application.

According to an eighth aspect, a processing apparatus is provided, including a processor and a memory. The processor is configured to read instructions stored in the memory, and may receive a signal by using a receiver, and transmit a signal by using a transmitter, to perform the method in the first aspect or the second aspect and any possible implementation of the first aspect or the second aspect.

Optionally, there are one or more processors, and there are one or more memories.

Optionally, the memory may be integrated with the processor, or the memory and the processor are separately disposed.

In a specific implementation process, the memory may be a non-transitory memory such as a read only memory (ROM), and the memory and the processor may be integrated on a same chip, or may be disposed on different chips.

A type of the memory and a manner of disposing the memory and the processor are not limited in this embodiment of this application.

It should be understood that a related data exchange process, for example, sending indication information, may be a process of outputting the indication information from the processor, and receiving capability information may be a process of receiving, by the processor, the input capability information. Specifically, data output by the processor may be output to the transmitter, and input data received by the processor may come from the receiver. The transmitter and the receiver may be collectively referred to as a transceiver.

The processing apparatus in the eighth aspect may be a chip. The processor may be implemented by using hardware or software. When the processor is implemented by using hardware, the processor may be a logic circuit, an integrated circuit, or the like. When the processor is implemented by using software, the processor may be a general purpose processor, and may be implemented by reading software code stored in the memory. The memory may be integrated into the processor, or may be located outside the processor and exist independently.

According to a ninth aspect, a computer program product is provided. The computer program product includes a computer program (also referred to as code or an instruction). When the computer program is run, a computer is enabled to perform the method in the first aspect or the second aspect and any possible implementation of the first aspect or the second aspect.

According to a tenth aspect, a computer readable medium is provided. The computer readable medium stores a computer program (also referred to as code or an instruction). When the computer program is run on a computer, the computer is enabled to perform the method in the first aspect or the second aspect and any possible implementation of the first aspect or the second aspect.

According to an eleventh aspect, a communications system is provided, including the network device and the terminal device described above.

DESCRIPTION OF EMBODIMENTS

The following describes technical solutions in this application with reference to accompanying drawings.

The technical solutions in embodiments of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a future 5th generation (5G) system, or new radio (NR).

Figure 1:
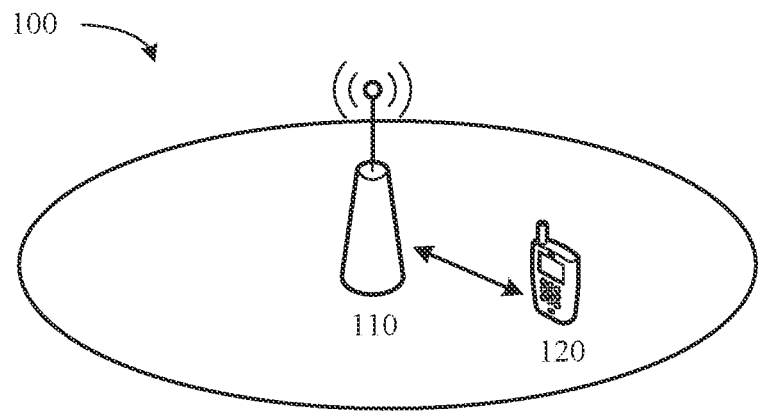
FIG. 1 is a schematic diagram of a communications system applicable to a precoding vector indicating and determining method provided in embodiments of this application.

For ease of understanding of the embodiments of this application, first, a communications system applicable to the embodiments of this application is described in detail by using a communications system shown in FIG. 1 as an example. FIG. 1 is a schematic diagram of a communications system 100 applicable to a precoding vector indicating and determining method provided in the embodiments of this application. As shown in FIG. 1, the communications system 100 may include at least one network device, for example, a network device 110 shown in FIG. 1. The communications system 100 may further include at least one terminal device, for example, a terminal device 120 shown in FIG. 1. The network device 110 and the terminal device 120 may communicate with each other by using a wireless link. Each communications device such as the network device 110 or the terminal device 120 may be configured with a plurality of antennas. For each communications device in the communications system 100, the plurality of configured antennas may include at least one transmit antenna configured to send a signal and at least one receive antenna configured to receive a signal. Therefore, the communications devices in the communications system 100, for example, the network device 110 and the terminal device 120, may communicate with each other by using a multi-antenna technology.

It should be understood that the network device in the communications system may be any device with a wireless transceiving function. The network device may include but is not limited to an evolved Node B (eNB), a radio network controller (RNC), a Node B (NB), a base station controller (BSC), a base transceiver station (BTS), a home base station (for example, a home evolved NodeB, or a home NodeB, an (HNB), a baseband unit (BBU), and an access point (AP), a wireless relay node, a wireless backhaul node, a transmission point (TP), a transmission and reception point (TRP), or the like in a wireless fidelity (Wi-Fi) system, or may be a gNB or a transmission point (TRP or TP) in a 5G system such as an NR system, or one antenna panel or a group of antenna panels (including a plurality of antenna panels) of a base station in a 5G system, or may be a network node, for example, a baseband unit (BBU) or a distributed unit (DU), constituting a gNB or a transmission point.

In some deployments, the gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Because information at the RRC layer finally changes to information at the PHY layer, or is converted from information at the PHY layer, in this architecture, higher layer signaling such as RRC layer signaling may also be considered as being sent by the DU or sent by the DU and the CU. It may be understood that the network device may be a CU node, a node, or a device including a CU node and a DU node. In addition, the CU may be classified as a network device in a radio access network (RAN), or the CU may be classified as a network device in a core network (CN). This is not limited in this application.

It should be further understood that the terminal device in the wireless communications system may also be referred to as user equipment (UE), an access terminal, a subscriber unit, a subscriber station, a mobile station, a mobile station, a remote station, a remote terminal, a mobile device, a user terminal, a terminal, a wireless communications device, a user agent, or a user apparatus. The terminal device in this embodiment of this application may be a mobile phone, a tablet computer (pad), a computer with a wireless transceiving function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in a smart city, a wireless terminal in a smart home, or the like. An application scenario is not limited in the embodiments of this application.

It should be further understood that FIG. 1 is merely a simplified schematic diagram of an example for ease of understanding. The communications system 100 may further include another network device or may further include another terminal device, and this is not shown in FIG. 1.

For ease of understanding the embodiments of this application, a process of processing a downlink signal at the physical layer before the downlink signal is sent is briefly described below. It should be understood that the process of processing the downlink signal described below may be performed by the network device, or may be performed by a chip configured in the network device. For ease of description, the network device and the chip configured in the network device are collectively referred to as the network device below.

The network device may process a code word on a physical channel. The code word may be a coded bit (for example, coding includes channel coding). The code word is scrambled to generate a scrambled bit. The scrambled bit is modulated and mapped, to obtain a modulated symbol. The modulated symbol is mapped, through layer mapping, to a plurality of layers, or referred to as transport layers. A modulated symbol obtained after the layer mapping is precoded, to obtain a precoded signal. The precoded signal is mapped to a plurality of REs through resource element (RE) mapping. These REs are then transmitted by using an antenna port after orthogonal frequency division multiplexing (OFDM) modulation.

It should be understood that the foregoing process of processing the downlink signal is merely an example, and should not constitute any limitation on this application. For the specific process of processing the downlink signal, refer to a conventional technology. For brevity, detailed description of the specific process is omitted herein.

For ease of understanding of the embodiments of this application, terms used in the embodiments of this application are first briefly described below.

1. Precoding technology: When a status of a channel is known, a sending device (for example, a network device) may process a to-be-sent signal by using a precoding matrix matching a channel resource, so that a precoded to-be-sent signal adapts to the channel, to reduce complexity of eliminating, by a receiving device (for example, a terminal device), inter-channel impact. Therefore, precoding the to-be-sent signal improves quality (for example, a signal to interference plus noise ratio (SINR)) of a received signal. Therefore, according to the precoding technology, a sending device and a plurality of receiving devices can perform transmission on a same time-frequency resource, in other words, a multi-user multiple-input multiple-output (MU-MIMO) is implemented.

It should be understood that related description of the precoding technology is merely an example for ease of understanding, and is not intended to limit the protection scope of the embodiments of this application. In a specific implementation process, the sending device may further perform precoding in another manner. For example, when channel information (for example, the channel information is but is limited to a channel matrix) cannot be learned, precoding is performed by using a preset precoding matrix or a weighted processing manner. For brevity, specific content thereof is not described in this specification.

2. Precoding matrix and precoding matrix indicator (PMI): The PMI may be used to indicate the precoding matrix. For example, the precoding matrix may be a precoding matrix that is determined by the terminal device based on a channel matrix of each frequency domain unit (for example, a subband) and that corresponds to the frequency domain unit.

The channel matrix may be determined by the terminal device in a manner such as channel estimation or based on channel reciprocity. However, it should be understood that a specific method for determining, by the terminal device, the channel matrix is not limited to the foregoing description. For a specific implementation, refer to the conventional technology. For brevity, the specific implementation is not listed herein.

The precoding matrix may be obtained by performing singular value decomposition (SVD) on a channel matrix or a covariance matrix of a channel matrix, or may be obtained by performing eigenvalue decomposition (EVD) on a covariance matrix of a channel matrix.

It should be understood that the precoding matrix determining manner listed in the foregoing specification is merely an example, and should not constitute any limitation on this application. For a precoding matrix determining manner, refer to the conventional technology. For brevity, the precoding matrix determining manner is not listed herein.

It should be noted that in the embodiments of this application, a precoding matrix corresponding to a frequency domain unit may be a precoding matrix fed back for the frequency domain unit, for example, may be a precoding matrix that is obtained by performing channel measurement based on a reference signal on the frequency domain unit and that is fed back. The precoding matrix corresponding to the frequency domain unit may be used as a precoding matrix to precode data that is subsequently transmitted by using the frequency domain unit. In the following specification, the precoding matrix corresponding to the frequency domain unit may be alternatively briefly referred to as the precoding matrix of the frequency domain unit, and a precoding vector corresponding to a frequency domain unit may be alternatively briefly referred to as the precoding vector of the frequency domain unit.

It should be further noted that in the embodiments of this application, a precoding matrix determined by the network device based on feedback of the terminal device may be directly used for downlink data transmission, or may be processed by using some beamforming methods, to obtain a precoding matrix finally used for downlink data transmission, where the beamforming methods, for example, include zero forcing (ZF), regularized zero-forcing (RZF), minimum mean square error (MMSE), and maximizing a signal-to-leakage-and-noise ratio (SLNR). This is not limited in this application. Unless otherwise specified, any precoding matrix (or vector) used in the following specification may be a precoding matrix (or vector) determined by the network device based on feedback of the terminal device.

3. Precoding vector: One precoding matrix may include one or more vectors, for example, one or more column vectors. One precoding matrix may be used to determine one or more precoding vectors.

When there is one transport layer and a transmit antenna includes one polarization direction, the precoding vector may be a precoding matrix. When there are a plurality of transport layers and a transmit antenna includes one polarization direction, the precoding vector may be a component of a precoding matrix at one transport layer. When there is one transport layer and a transmit antenna includes a plurality of polarization directions, the precoding vector may be a component of a precoding matrix in one polarization direction. When there are a plurality of transport layers and a transmit antenna includes a plurality of polarization directions, the precoding vector may be a component of a precoding matrix at one transport layer and in one polarization direction.

It should be understood that the precoding vector may be alternatively determined based on a vector in a precoding matrix, for example, may be obtained after mathematical transformation is performed on the vector in the precoding matrix. A mathematical transformation relationship between a precoding matrix and a precoding vector is not limited in this application.

4. Reporting bandwidth: In the embodiments of this application, the reporting bandwidth may be a bandwidth corresponding to a reporting bandwidth (csi-ReportingBand) field in an information element (IE) CSI reporting configuration (CSI-ReportConfig) of a network device. When the network device indicates, by using the csi-ReportingBand, a subband for which reporting is to be performed, the bandwidth corresponding to the csi-ReportingBand may be the reporting bandwidth.

The terminal device may receive a CSI-RS on the reporting bandwidth, to perform channel measurement and reporting. In the embodiments of this application, the reporting bandwidth may be a bandwidth occupied by a CSI-RS based on which the terminal device performs CSI reporting once.

In an implementation, the reporting bandwidth may be a frequency domain bandwidth occupied by a CSI-RS resource. The frequency domain bandwidth occupied by the CSI-RS resource may be configured by using a frequency domain bandwidth (CSI-FrequencyOccupation) occupied by IE CSI.

The network device may further indicate, by using the csi-ReportingBand field, a quantity of subbands (that is, an example of a frequency domain unit) for which reporting is to be performed and locations of the subbands. The field may be a bitmap. A length of the bitmap may be a quantity of subbands included in the reporting bandwidth. In other words, a bandwidth occupied by a first indication bit to a last indication bit of the bitmap may be the foregoing reporting bandwidth. Each indication bit of the bitmap may correspond to one subband in the reporting bandwidth. Each indication bit is used to indicate whether CSI needs to be reported for the corresponding subband. For example, when the indication bit is set to "1", CSI needs to be reported for the corresponding subband, or when the indication bit is set to "0", no CSI needs to be reported for the corresponding subband. It should be understood that a meaning expressed by a value of an indication bit in the foregoing description is merely an example, and should not constitute any limitation on this application.

It should be understood that signaling used to configure the reporting bandwidth and signaling used to indicate a subband for which reporting is to be performed in the foregoing description are merely examples, and should not constitute any limitation on this application. Signaling used to indicate the reporting bandwidth, signaling used to indicate a subband for which reporting is to be performed, and specific indicating manners are not limited in this application.

It should be further understood that the description of the reporting bandwidth in the foregoing specification is merely an example for ease of understanding, and should not constitute any limitation on this application.

5. Antenna port: The antenna port is briefly referred to as a port, and may be understood as a virtual antenna identified by a receiving device, or a transmit antenna that can be distinguished in space. One antenna port may be configured for each virtual antenna, each virtual antenna may be a weighted combination of a plurality of physical antennas, and each antenna port may correspond to one reference signal. Therefore, each antenna port may be referred to as a port of one reference signal. In the embodiments of this application, the antenna port may be an actual independent sending unit (e.g., a transceiver unit, TxRU).

6. Spatial domain vector: The spatial domain vector is alternatively referred to as a beam vector. Each element in the spatial domain vector may represent a weight of each antenna port. Linear combination is performed on signals of antenna ports based on the weights of the antenna ports represented by the elements in the spatial domain vector, to form a region with a relatively strong signal in a particular direction in space.

For ease of description in the following specification, it is assumed that the spatial domain vector is denoted as u. A length of the spatial domain vector u may be a quantity $N_s$ of transmit antenna ports in one polarization direction, where $N_s$ is an integer greater than or equal to 1. For example, the spatial domain vector may be a column vector or a row vector with a length of $N_s$. This is not limited in this application.

For a definition of the spatial domain vector, refer to a two-dimensional (2D)-discrete Fourier transform (DFT) vector or an over-sampled 2D-DFT vector $v_{l,m}$ defined in a type II codebook in the NR protocol TS 38.214, release 15 (R15). For brevity, details are not described herein.

7. Spatial domain vector set: The spatial domain vector set may include a plurality of spatial domain vectors with different lengths, to correspond to different quantities of transmit antenna ports. In the embodiments of this application, because a length of the spatial domain vector is $N_s$, a length of each spatial domain vector in a spatial domain vector set to which a spatial domain vector reported by the terminal device belongs is $N_s$.

In a possible design, the spatial domain vector set may include $N_s$ spatial domain vectors, and any two of the $N_s$ spatial domain vectors may be orthogonal to each other. Each spatial domain vector in the spatial domain vector set may be obtained from a 2D-DFT matrix. 2D may represent two different directions, for example, a horizontal direction and a vertical direction.

For example, the $N_s$ spatial domain vectors may be denoted as $u_1, u_2, \ldots,$ and $u_{N_s}$. A matrix $B_s$ may be constructed by using the $N_s$ spatial domain vectors, where $B_s \triangleq [u_1, u_2 \ldots u_{N_s}]$.

In another possible design, the spatial domain vector set may be extended to $O_s \times N_s$ spatial domain vectors by using an over-sampling factor $O_s$. In this case, the spatial domain vector set may include $O_s$ subsets, and each subset may include $N_s$ spatial domain vectors. Any two of the $N_s$ spatial domain vectors in each subset may be orthogonal to each other. Each spatial domain vector in the spatial domain vector set may be obtained from an over-sampled 2D-DFT matrix. The over-sampling factor $O_s$ is a positive integer. Specifically, $O_s = O_1 \times O_2$, $O_1$ may be an over-sampling factor in a horizontal direction, and $O_2$ may be an over-sampling factor in a vertical direction. $O_1 \geq 1$, $O_2 \geq 1$, $O_1$ and $O_2$ are not 1 at the same time, and are integers.

For example, $N_s$ spatial domain vectors in an $o_s^{th}$ ($1 \leq o_s \leq O_s$ and $o_s$ is an integer) subset in the spatial domain vector set may be respectively denoted as $u_1^{o_s}, u_2^{o_s}, \ldots,$ and $u_{N_s}^{o_s}$. Then, a matrix $B_s^{o_s}$ may be constructed based on the $N_s$ spatial domain vectors in the $o_s^{th}$ subset, where $B_s^{o_s} \triangleq [u_1^{o_s} u_2^{o_s} \ldots u_{N_s}^{o_s}]$.

Therefore, each spatial domain vector in the spatial domain vector set may be obtained from a 2D-DFT matrix or an over-sampled 2D-DFT matrix. Each column vector in the spatial domain vector set may be referred to as a 2D-DFT vector or an over-sampled 2D-DFT vector. In other words, the spatial domain vector may be a 2D-DFT vector or an over-sampled 2D-DFT vector.

8. Frequency domain vector: The frequency domain vector is a vector proposed in the embodiments of this application to indicate a change law of a channel in frequency domain. Each frequency domain vector may represent one change law. When a signal is transmitted on a wireless channel, the signal may reach a receive antenna from a transmit antenna through a plurality of paths. A multipath delay causes frequency selective fading, namely, a change of the channel in frequency domain. Therefore, change laws of the channel in frequency domain that are caused by delays on different transmission paths may be represented by using different frequency domain vectors.

For ease of description in the following specification, it is assumed that the frequency domain vector is denoted as v. A length of the frequency domain vector may be denoted as $N_f$, where $N_f$ is an integer greater than or equal to 1.

9. Frequency domain vector set: The frequency domain vector set may include a plurality of frequency domain vectors with different lengths. One or more frequency domain vectors in the frequency domain vector set are selected to construct a precoding vector.

In a possible design, the frequency domain vector set may include a plurality of frequency domain vectors. Any two of the plurality of frequency domain vectors may be orthogonal to each other. Each frequency domain vector in the frequency domain vector set may be obtained from a DFT matrix.

For example, the $N_f$ frequency domain vectors may be denoted as $v_1, v_2, \ldots,$ and $v_{N_f}$. A matrix $B_f$ may be constructed by using the $N_f$ frequency domain vectors, where $B_f \triangleq [v_1 v_2 \ldots v_{N_f}]$.

In another possible design, the frequency domain vector set may be extended to $O_f \times N_f$ frequency domain vectors by using an over-sampling factor $O_f$. In this case, the frequency domain vector set may include $O_f$ subsets, and each subset may include $N_f$ frequency domain vectors. Any two of the $N_f$ frequency domain vectors in each subset may be orthogonal to each other. Each subset may be referred to as one orthogonal group. Each frequency domain vector in the frequency domain vector set may be obtained from an over-sampled DFT matrix. The over-sampling factor $O_f$ is a positive integer.

For example, $N_f$ frequency domain vectors in an $o_f^{th}$ ($1 \leq o_f \leq O_f$ and $o_f$ is an integer) subset in the frequency domain vector set may be respectively denoted as $v_1^{o_f}, v_2^{o_f}, \ldots,$ and $v_{N_f}^{o_f}$. Then, a matrix $B_f^{o_f}$ may be constructed based on the $N_f$ frequency domain vectors in the $o_f^{th}$ subset, where $B_f^{o_f} \triangleq [v_1^{o_f} v_2^{o_f} \ldots v_{N_f}^{o_f}]$.

Therefore, each frequency domain vector in the frequency domain vector set may be obtained from a DFT matrix or an over-sampled DFT matrix. Each column vector in the frequency domain vector set may be referred to as a DFT vector or an over-sampled DFT vector. In other words, the frequency domain vector may be a DFT vector or an over-sampled MT vector.

10. Space frequency component matrix: One space frequency component matrix may be determined by using one spatial domain vector and one frequency domain vector. For example, one space frequency component matrix may be determined based on one spatial domain vector and a conjugate transpose of one frequency domain vector, for example, $u \times v^H$, and a dimension of the matrix may be $N_s \times N_f$.

It should be understood that the space frequency component matrix may be a representation form of a basic space frequency unit determined based on one spatial domain vector and one frequency domain vector. For example, the basic space frequency unit may be alternatively represented as a space frequency component vector, and the space frequency component vector may be determined based on a Kronecker product of one spatial domain vector and one frequency domain vector. For example, the basic space frequency unit may be alternatively represented as a space frequency vector pair. A specific representation form of the basic space frequency unit is not limited in this application. All possible forms determined by a person skilled in the art based on a same concept and based on one spatial domain vector and one frequency domain vector shall fall within the protection scope of this application. In addition, if a form different from that listed in the foregoing specification is defined for the spatial domain vector or the frequency domain vector, an operation relationship between a space frequency component matrix and both of a spatial domain vector and a frequency domain vector may also be different. An operation relationship between a space frequency component matrix and both of a spatial domain vector and a frequency domain vector is not limited in this application.

11. Space frequency matrix: In the embodiments of this application, the space frequency matrix may be understood as an intermediate item used to determine a precoding matrix. For the terminal device, the space frequency matrix may be determined based on a precoding matrix or a channel matrix. For the network device, the space frequency matrix may be obtained based on a weighted sum of a plurality of space frequency component matrices, to restore a downlink channel or a precoding matrix.

As described above, the space frequency component matrix may be represented as a matrix with a dimension of $N_s \times N_f$, and the space frequency matrix may also be represented as a matrix with a dimension of $N_s \times N_f$. The space frequency matrix with a dimension of $N_s \times N_f$ may include $N_f$ column vectors with a length of $N_s$. The $N_f$ column vectors may correspond to $N_f$ frequency domain units, and each column vector may be used to determine a precoding vector of a corresponding frequency domain unit.

For example, the space frequency matrix may be denoted as H, where $H=[w_1 \ w_2 \ \ldots \ w_{N_f}]$, $w_1$ to $w_{N_f}$ are $N_f$ column vectors corresponding to $N_f$ frequency domain units, and a length of each column vector may be $N_s$. The $N_f$ column vectors may be respectively used to determine precoding vectors of the $N_f$ frequency domain units.

It should be understood that the space frequency matrix is merely a representation form of an intermediate item used to determine a precoding matrix, and should not constitute any limitation on this application. For example, column vectors in the space frequency matrix are connected end to end in a sequence from left to right, or are arranged according to another predefined rule, to obtain a vector with a length of $N_s \times N_f$, and the vector may be referred to as a space frequency vector.

It should be further understood that the dimensions of the space frequency matrix and the space frequency vector in the foregoing specification are merely examples, and should not constitute any limitation on this application. For example, the space frequency matrix may be alternatively a matrix with a dimension of $N_f \times N_s$. Each row vector may correspond to one frequency domain unit, to determine a precoding vector of the corresponding frequency domain unit.

In addition, when a transmit antenna is configured with a plurality of polarization directions, a dimension of the space frequency matrix may be further extended. For example, for a dual-polarized antenna, a dimension of the space frequency matrix may be $2N_s \times N_f$ or $N_f \times 2N_s$. It should be understood that a quantity of polarization directions of the transmit antenna is not limited in this application.

12. Dual-domain compression: Dual-domain compression includes spatial domain compression and frequency domain compression. The spatial domain compression may mean that one or more spatial domain vectors are selected from a spatial domain vector set as a spatial domain vector used to construct a precoding vector. The frequency domain compression may mean that one or more frequency domain vectors are selected from a frequency domain vector set as a frequency domain vector used to construct a precoding vector. The selected spatial domain vector is a part or all of spatial domain vectors in the spatial domain vector set. The selected frequency domain vector is a part or all of frequency domain vectors in the frequency domain vector set.

For example, a matrix determined based on one spatial domain vector and one frequency domain vector may be the foregoing space frequency component matrix. The selected one or more spatial domain vectors and one or more frequency domain vectors may be used to determine one or more space frequency component matrices. A weighted sum of the one or more space frequency component matrices may be used to construct a space frequency matrix corresponding to one transport layer. In other words, the space frequency matrix may be approximately a weighted sum of the space frequency component matrix determined based on the selected one or more spatial domain vectors and one or more frequency domain vectors. Herein, a spatial domain vector and a frequency domain vector that are used to construct one space frequency component matrix may be referred to as one space frequency vector pair.

Therefore, after obtaining a spatial domain vector, a frequency domain vector, and a weighting coefficient that can be used to construct a space frequency matrix, the network device can further determine, based on the constructed space frequency matrix, a precoding vector corresponding to each frequency domain unit.

Currently, an implementation is known. The terminal device may feed back a spatial domain vector, a frequency domain vector, and a weighting coefficient to the network device based on a quantity of frequency domain units for which reporting is to be performed in a reporting bandwidth and locations of the frequency domain units that are indicated by the network device, so that the network device constructs a precoding vector corresponding to each frequency domain unit. In other words, the terminal device performs, by using a same group of space frequency vector pairs, linear combination on the frequency domain units for which reporting is to be performed in the reporting bandwidth, to construct the precoding vector of each frequency domain unit.

However, this implementation may not bring about relatively high feedback precision. For example, if continuity of a distribution of frequency domain unit for which reporting is to he performed in a spectrum is poor, or a distribution of frequency domain unit for which reporting is to be performed is relatively sparse, a frequency domain vector fed back by the terminal device may use a length the same as a quantity of frequency domain units for which reporting is to be performed. In this case, the frequency domain vector cannot accurately reflect a change law of a channel in frequency domain.

In view of this, this application provides a preceding vector indicating and determining method, to achieve relatively high feedback precision in a case of equivalent overheads.

For ease of understanding the embodiments of this application, before the embodiments of this application are described, the following descriptions are first provided.

First, for ease of understanding and description, main parameters used in this application are first described as follows.

R is a quantity of frequency domain unit groups, and R is an integer greater than or equal to 2. The R frequency domain unit groups may include a first frequency domain unit group to an $R^{th}$ frequency domain unit group.

$N_{f,r}$ is a length of a frequency domain vector determined for an $r^{th}$ frequency domain unit group in the R frequency domain unit groups, $1 \leq r \leq R$, and $N_{f,r}$ is an integer greater than or equal to 1.

$N_s$ is a length of a spatial domain vector, and $N_s$ is an integer greater than or equal to 1.

$M_r$ is a quantity of to-be-reported frequency domain vectors that is determined for the $r^{th}$ frequency domain unit group, and $M_r$ is an integer greater than or equal to 1.

M is a total quantity of frequency domain vectors reported for the R frequency domain unit groups, and M is an integer greater than or equal to 1.

L is a quantity of reported spatial domain vector, and L is an integer greater than or equal to 1.

$T_r$ is a quantity of to-be-reported weighting coefficients that is configured for the $r^{th}$ frequency domain unit group, and $T_r$ is an integer greater than or equal to 1.

T is a total quantity of to-be-reported weighting coefficients that is configured for the R frequency domain unit groups, and T is an integer greater than or equal to 1.

$K_r$ is a quantity of weighting coefficients reported for the $r^{th}$ frequency domain unit group, and $K_r$ is an integer greater than or equal to 1.

K is a total quantity of weighting coefficients reported for the R frequency domain unit group, K is an integer greater than or equal to 1, and $$K = \sum_{r=1}^{R} K_r.$$

Second, in the embodiments of this application, for ease of description, for numbers, consecutive numbering may start from 1. For example, the R frequency domain unit groups may include the first frequency domain unit group to the $R^{th}$ frequency domain unit group. For another example, the L spatial domain vectors may include a first spatial domain vector to an $L^{th}$ spatial domain vector, and so on. Examples are not described one by one herein. Certainly, specific implementation is not limited thereto. For example, consecutive numbering may alternatively start from 0. It should be understood that the foregoing descriptions are provided for ease of describing the technical solutions provided in the embodiments of this application, but are not used to limit the scope of this application.

Third, in the embodiments of this application, transformation between a matrix and a vector is described in a plurality of parts. For ease of understanding, description is provided herein together. A superscript T represents a transpose, for example, $A^T$ represents a transpose of a matrix (or vector) A. A superscript H represents a conjugate transpose, for example, $A^H$ represents a conjugate transpose of a matrix (or vector) A. For brevity, description of a same or similar case is omitted in the following specification.

Fourth, in the following embodiments, the embodiments provided in this application are described by using an example in which both a beam vector and a frequency domain vector are column vectors, but this should not constitute any limitation on this application. A person skilled in the art may think of more other possible representation manners based on a same concept.

Fifth, in the embodiments of this application, "used for indication" may include used for direct indication and used for indirect indication. For example, that indication information is described as being used to indicate information I may include that the indication information directly indicates I or indirectly indicates I, and this does not mean that the indication information definitely carries I.

The information indicated by the indication information is referred to as to-be-indicated information. In a specific implementation process, the to-be-indicated information is indicated in a plurality of manners. By way of example rather than limitation, the to-be-indicated information may be directly indicated by using the to-be-indicated information itself or an index of the to-be-indicated information. Alternatively, the to-be-indicated information may be indirectly indicated by indicating other information, where there is an association relationship between the other information and the to-be-indicated information. Alternatively, only a part of the to-be-indicated information may be indicated, and the other part of the to-be-indicated information is known or is agreed upon in advance. For example, particular information may be indicated by using a pre-agreed information arrangement sequence (for example, a sequence specified in a protocol), to reduce indication overheads to some extent. In addition, a common part of pieces of information may be further identified and indicated together, to reduce indication overheads caused because same pieces of information are indicated separately. For example, a person skilled in the art should understand that a precoding matrix includes precoding vectors, and the precoding vectors in the precoding matrix may include a same part in terms of composition or another attribute.

In addition, a specific indicating manner may be alternatively various existing indicating manners, and for example, includes but is not limited to the foregoing indicating manners and various combinations thereof. For specific details of the indicating manners, refer to the conventional technology. Details are not described herein. It can be learned from the foregoing specification that for example, when a plurality of pieces of information of a same type need to be indicated, different information may be indicated in different manners. In a specific implementation process, a needed indicating manner may be selected based on a specific requirement. The selected indicating manner is not limited in the embodiments of this application. In this way, the indicating manner used in the embodiments of this application should be understood as covering various methods for enabling a to-be-indicated party to learn of to-be-indicated information.

In addition, the to-be-indicated information may have another equivalent form. For example, a row vector may be represented as a column vector, a matrix may be represented by using a transposed matrix of the matrix, or a matrix may be represented in a form of a vector or an array, the vector or the array may be formed by connecting row vectors or column vectors of the matrix, and a Kronecker product of two vectors may be represented in a form such as a product of a vector and a transposed vector of another vector. The technical solutions provided in the embodiments of this application should be understood as covering various forms. For example, some or all of features in the embodiments of this application should be understood as covering various representation forms of the features.

The to-be-indicated information may be sent together as a whole, or may be divided into a plurality of pieces of sub-information for separate sending, and sending periods and/or sending occasions of the sub-information may be the same, or may be different. A specific sending method is not limited in this application. The sending periods and/or the sending occasions of the sub-information may be predefined, for example, predefined according to a protocol, or may be configured by a transmit end device in a manner of sending configuration information to a receive end device. For example, the configuration information may include but is not limited to one of or a combination of at least two of radio resource control signaling such as RRC signaling, MAC layer signaling such as MAC-CE signaling, and physical layer signaling such as downlink control information (DCI).

Sixth, definitions of many features (for example, a Kronecker product, CSI, a PMI, a spatial domain vector, a frequency domain vector, a weighting coefficient of a space frequency vector pair, and a CSI-RS resource) in this application are merely used to explain functions of the features by way of example. For detailed content, refer to the conventional technology.

Seventh, in the following embodiments, first, second, third, fourth, and various numerical numbers are merely for distinguishing and for ease of description, but are not used to limit the scope of the embodiments of this application. For example, the numbers are used to distinguish between different fields and different indication information.

Eighth, "predefinition" may be implemented by pre-storing corresponding code or a corresponding table in a device (for example, including a terminal device and a network device), or may be implemented in another manner that may be used to indicate related information. A specific implementation thereof is not limited in this application.

"Storing" may mean being stored in one or more memories. The one or more memories may be separately disposed, or may be integrated into an encoder, a decoder, a processor, or a communications apparatus. Some of the one or more memories may be independently disposed, and some may be integrated into the encoder, the decoder, the processor, or the communications apparatus. A type of the memory may be a storage medium in any form. This is not limited in this application.

Ninth, the "protocol" used in the embodiments of this application may be a standard protocol in the communications field, for example, may include an LTE protocol, an NR protocol, and a related protocol applied to a future communications system. This is not limited in this application.

Tenth, "at least one" means one or more, and "a plurality of" means two or more. The term "and/or" describes an association relationship between associated objects and represents that three relationships may exist. For example, A and/or B may represent the following three cases: Only A exists, both A and B exist, and only B exists. A and B may be singular or plural. The character "/" generally indicates an "or" relationship between the associated objects. "At least one of the following items" or a similar expression means any combination of these items, including a single item or any combination of a plurality of items. For example, at least one of a, b, and c may represent a, b, c, a and b, a and c, b and c, or a, b, and c, where each of a, b, and c may be in a singular form or a plural form.

The following describes, in detail with reference to the accompanying drawings, the precoding vector indicating and determining method provided in the embodiments of this application.

It should be understood that the method provided in the embodiments of this application may be applied to a system in which communication is performed by using a multi-antenna technology, for example, the communications system 100 shown in FIG. 1. The communications system may include at least one network device and at least one terminal device. The network device and the terminal device may communicate with each other by using a multi-antenna technology.

It should be further understood that a specific structure of an execution body of the method provided in the embodiments of this application is not limited in the following embodiments provided that a program that records code of the method provided in the embodiments of this application can be run to perform communication according to the method provided in the embodiments of this application. For example, the execution body of the method provided in the embodiments of this application may be a terminal device or a network device, or function modules in the terminal device or the network device that are capable of invoking and executing a program.

Without loss of generality, the following describes, in detail by using interaction between the network device and the terminal device as an example, the precoding vector indicating and determining method provided in the embodiments of this application.

Figure 2:
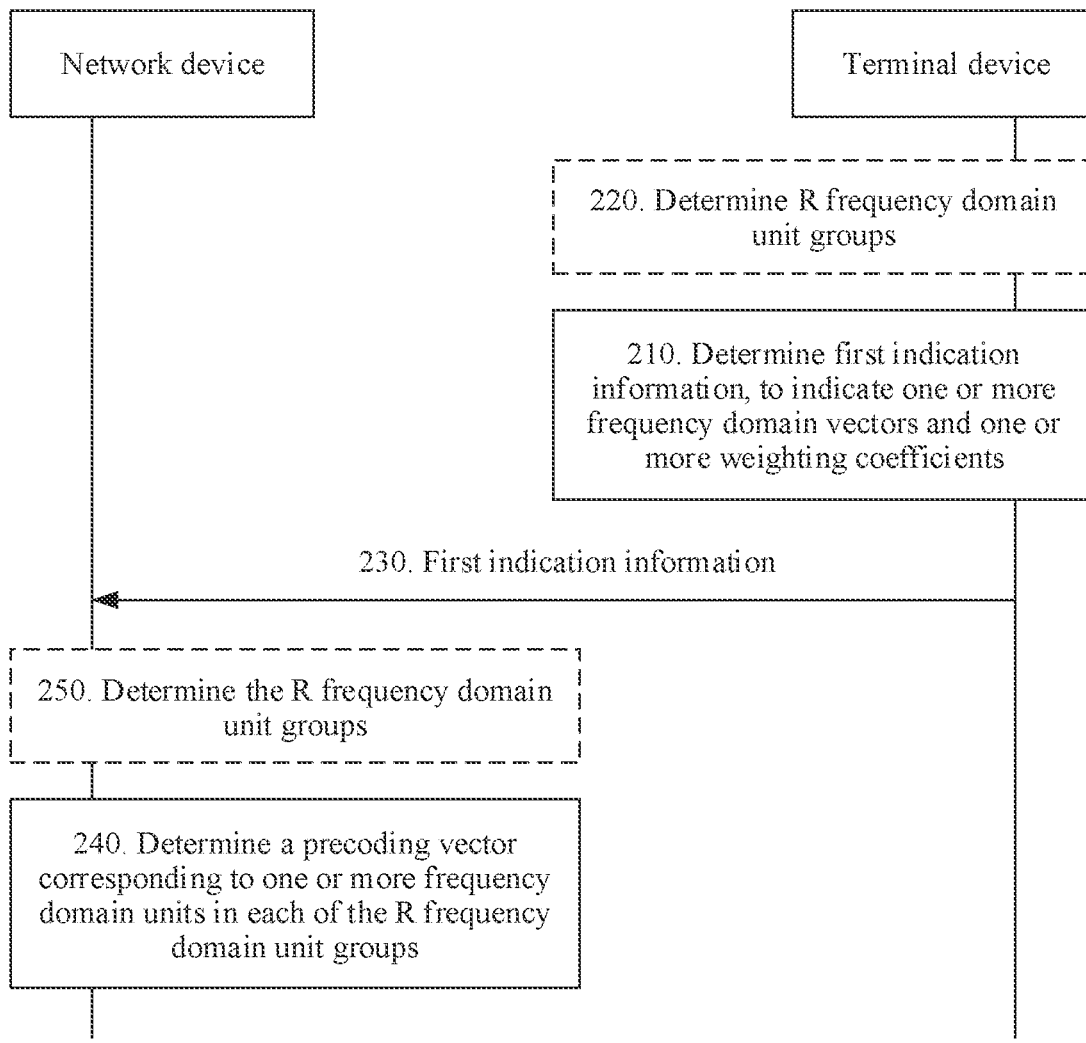
FIG. 2 is a schematic flowchart of a precoding vector indicating and determining method according to an embodiment of this application.

FIG. 2 is a schematic flowchart of a precoding vector indicating and determining method 200 according to an embodiment of this application from a perspective of interaction between devices. As shown in the figure, the method 200 may include step 210 to step 250.

For ease of understanding, first, a specific process in which a terminal device indicates a precoding vector and a network device determines the precoding vector based on one transport layer in one or more transport layers (for example, Z transport layers, where Z is a positive integer) and one polarization direction in one or more polarization directions is described in detail. It should be understood that a quantity of transport layers and a quantity of polarization directions of a transmit antenna are not limited in this application. In the following example description, a transport layer may be any one of the one or more transport layers, and a polarization direction may be any one of the one or more polarization directions.

The following describes in detail the steps of the method.

In step 210, the terminal device generates first indication information, where the first indication information is used to indicate one or more frequency domain vectors and one or more weighting coefficients.

In this embodiment of this application, the one or more frequency domain vectors may include a frequency domain vector reported for each of R frequency domain unit groups, and the one or more weighting coefficients may include a weighting coefficient reported for each of the R frequency domain unit groups.

R may be an integer greater than or equal to 2. For example, a bandwidth occupied by each frequency domain unit group may be a part of a reporting bandwidth. In other words, a frequency domain unit for which reporting is to be performed and that is included in a frequency domain unit group may be a subset of frequency domain units included in the reporting bandwidth. In other words, a frequency domain unit group may be a subset of the reporting bandwidth.

Each of the R frequency domain unit groups may include one or more frequency domain units for which reporting is to be performed. Herein, the frequency domain unit for which reporting is to be performed may be a frequency domain unit for which CSI needs to be fed back and that is determined by the terminal device based on an indication of the network device. The frequency domain unit for which reporting is to be performed may be alternatively referred to as a frequency domain unit for which feedback is to be performed.

For example, the frequency domain unit for which reporting is to be performed may be a subband for which reporting is to be performed and that is indicated by the network device by using the foregoing csi-ReportingBand, or may be a frequency domain unit that is of another granularity and that corresponds to the subband for which reporting is to be performed. Herein, corresponding to the subband for which reporting is to be performed may mean that a band occupied, in a frequency domain resource, by the frequency domain unit for which reporting is to be performed is the same as a band occupied by the subband for which reporting is to be performed, where reporting granularities may be different. For detailed description of the frequency domain unit for which reporting is to be performed, refer to related description that is provided below with reference to FIG. 3 to FIG. 5.

Because the frequency domain vector and the weighting coefficient that are indicated in the first indication information are determined for the R frequency domain unit groups, the terminal device may first determine the R frequency domain unit groups before generating the first indication information.

Optionally, the method 200 further includes: Step 220. The terminal device determines the R frequency domain unit groups.

In an implementation, the terminal device may determine the R frequency domain unit groups from the reporting bandwidth according to a predefined rule.

For example, the rule may be as follows: A quantity of frequency domain unit groups is predefined, the reporting bandwidth is evenly divided into a plurality of parts based on a quantity of frequency domain units included in the reporting bandwidth, and a first or last frequency domain unit for which no reporting needs to be performed in each part is excluded, to obtain a plurality of frequency domain unit groups.

Figure 3:
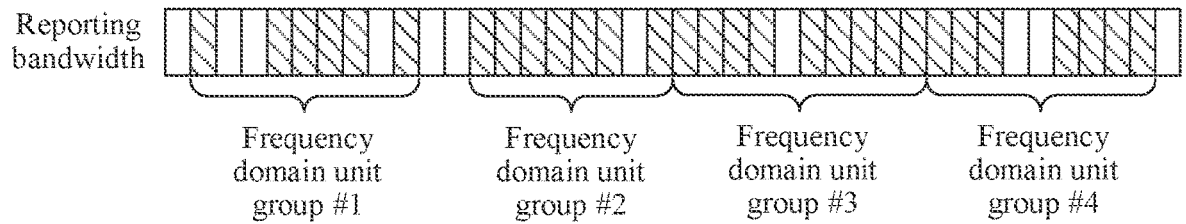
FIG. 3 and FIG. 4 are schematic diagrams of frequency domain unit groups and a reporting bandwidth according to an embodiment of this application.

FIG. 3 shows an example of frequency domain unit groups and a reporting bandwidth. As shown in the figure, FIG. 3 shows a reporting bandwidth including 40 frequency domain units. Each shaded square ■ in the figure represents one frequency domain unit for which reporting is to be performed.

FIG. 3 shows an example of evenly dividing the reporting bandwidth into four frequency domain unit groups. In other words, R=4. The four frequency domain unit groups include a frequency domain unit group #1 to a frequency domain unit group #4. Each frequency domain unit group includes 10 frequency domain units. Each frequency domain unit group includes a different quantity of frequency domain units for which reporting is to be performed.

When the frequency domain units in the reporting bandwidth are grouped, the frequency domain units may be grouped in a sequence from a first frequency domain unit to a last frequency domain unit, or may be grouped in a sequence from a last frequency domain unit to a first frequency domain unit. This is not limited in this application.

It should be understood that FIG. 3 is merely an example, and should not constitute any limitation on this application. For example, when the quantity of frequency domain units included in the reporting bandwidth is not an integer multiple of the predefined quantity of frequency domain unit groups, a quantity of frequency domain units included in the last frequency domain unit group may be less than a quantity of frequency domain units included in the other frequency domain unit group. For another example, the four frequency domain unit groups shown in FIG. 3 may include one or more frequency domain unit groups that do not include a frequency domain unit for which reporting is to be performed. In this case, the frequency domain unit group that does not include a frequency domain unit for which reporting is to be performed may be ignored, and no reporting is performed. In other words, there may be three frequency domain unit groups. Then, a quantity of frequency domain unit groups that is actually determined by the terminal device may be less than or equal to the predefined quantity of frequency domain unit groups.

For example, the rule may be as follows: When a quantity of frequency domain units spaced between two adjacent frequency domain units for which reporting is to be performed in the reporting bandwidth is greater than or equal to a first threshold, the reporting bandwidth is divided into two or more parts by a part between the two adjacent frequency domain units for which reporting is to be performed, and first and last frequency domain units for which no reporting needs to be performed in each part are excluded, to obtain two or more frequency domain unit groups. For example, the first threshold may be a predefined value, for example, a value defined in a protocol.

Figure 4:
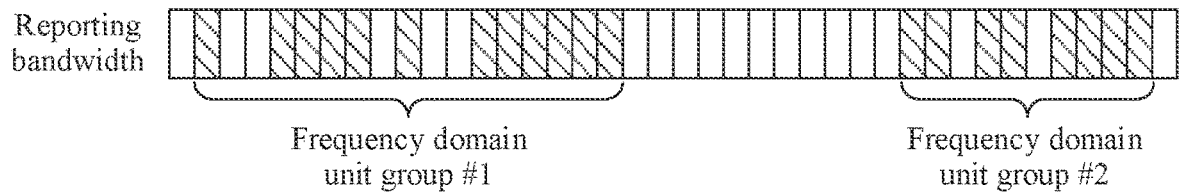

FIG. 4 shows another example of frequency domain unit groups and a reporting bandwidth. As shown in the figure, FIG. 3 shows a reporting bandwidth including 40 frequency domain units. Each shaded square ■ in the figure represents one frequency domain unit for which reporting is to be performed.

FIG. 4 shows an example of dividing the reporting bandwidth into two frequency domain unit groups. In other words, R=2. The two frequency domain unit groups include a frequency domain unit group #1 and a frequency domain unit group #2. A relatively large quantity of frequency domain units are spaced between the frequency domain unit group #1 and the frequency domain unit group #2. It is assumed that the first threshold is 6, and the quantity of frequency domain units spaced between the frequency domain unit group #1 and the frequency domain unit group #2 is greater than the threshold. Therefore, the reporting bandwidth may be divided into the two frequency domain unit groups. The frequency domain unit group #1 includes 17 frequency domain units, including 12 frequency domain units for which reporting is to be performed. The frequency domain unit group #2 includes 10 frequency domain units, including eight frequency domain units for which reporting is to be performed.

However, it should be understood that FIG. 4 is merely an example. The reporting bandwidth may be further divided into more frequency domain unit groups based on a quantity of frequency domain units spaced between two adjacent frequency domain units for which reporting is to be performed.

For example, the rule may be alternatively as follows: When a ratio of a quantity of frequency domain units spaced between two adjacent frequency domain units for which reporting is to be performed in the reporting bandwidth to a quantity of frequency domain units included in the reporting bandwidth is greater than or equal to a second threshold, the reporting bandwidth is divided into two parts by a part between the two adjacent frequency domain units for which reporting is to be performed, and the two parts respectively belong to two frequency domain unit groups. For example, the second threshold may be a predefined value, for example, a value defined in a protocol.

Certainly, the reporting bandwidth may be alternatively divided into more frequency domain unit groups based on a relationship between a ratio of a quantity of frequency domain units spaced between two adjacent frequency domain units for which reporting is to be performed to a quantity of frequency domain units included in the reporting bandwidth and the second threshold. This is not limited in this application.

It should be further understood that merely for ease of understanding, several rules that may be used to determine the frequency domain unit groups are listed above by way of example, but this should not constitute any limitation on this application. A specific rule for determining the frequency domain unit groups is not limited in this application.

In another implementation, the network device may notify, in advance by using signaling, the terminal device of a location of a frequency domain unit included in each of the R frequency domain unit groups in the reporting bandwidth.

It should be understood that the foregoing specific method for determining the frequency domain unit groups is merely an example, and should not constitute any limitation on this application. A specific method for determining the frequency domain unit groups from the reporting bandwidth is not limited in this application.

It should be further understood that FIG. 3 and FIG. 4 are merely shown for ease of understanding a relationship between a frequency domain unit group and a reporting bandwidth. In the figures, a granularity of a frequency domain unit in a frequency domain unit group is the same as a granularity of the reporting bandwidth, but this should not constitute any limitation on this application. A value relationship between a granularity of a frequency domain unit in a frequency domain unit group and a granularity of a frequency domain unit in the reporting bandwidth is not limited in this application. For example, in an example of FIG. 5 in the following specification, a granularity of a frequency domain unit in a frequency domain unit group is different from a granularity of a frequency domain unit in the reporting bandwidth.

The network device may notify, by using signaling, the terminal device of a frequency domain unit for which reporting is to be performed in the reporting bandwidth.

Optionally, the method 200 further includes: The terminal device receives ninth indication information, where the ninth indication information may be used to indicate a quantity of frequency domain units for which reporting is to be performed in the reporting bandwidth and locations of the frequency domain units. Correspondingly, the network device sends the ninth indication information.

In a possible design, the ninth indication information may be csi-ReportingBand in IE CSI-ReportConfig. In other words, the network device may indicate, by using the csi-ReportingBand, a subband for which reporting is to be performed. As described above, the csi-ReportingBand may be specifically a bitmap with a length the same as a quantity of subbands included in the reporting bandwidth, to indicate, by using each indication bit of the bitmap, whether a corresponding subband is a subband for which reporting is to be performed. The csi-ReportingBand has been described in detail above. Therefore, for brevity, details are not described herein again.

If a frequency domain unit based on which the terminal device reports the first indication information is a subband, the quantity of frequency domain units for which reporting is to be performed in the foregoing specification may be equal to a quantity, indicated in the csi-ReportingBand, of subbands for which reporting is to be performed. If a granularity of the frequency domain unit based on which the terminal device reports the first indication information is less than a granularity of a subband, the quantity of frequency domain units for which reporting is to be performed in the foregoing specification may be greater than the quantity of subbands that is indicated in the csi-ReportingBand. For example, the quantity of frequency domain units for which reporting is to be performed may be an integer multiple of the quantity of subbands that is indicated in the csi-ReportingBand. In other words, a quantity of resource blocks (RB) included in each subband may be an integer multiple of a quantity of RBs included in each frequency domain unit. If a ratio of a value of the granularity of the subband to a value of the granularity of the frequency domain unit is denoted as α, α may be an integer greater than or equal to 1.

It should be noted that in the reporting bandwidth corresponding to the csi-ReportingBand, a ratio of a granularity of each of a first subband and a last subband to the granularity of the frequency domain unit may be different from a ratio of a granularity of another subband to the granularity of the frequency domain unit, but this is not limited in this application.

It should be further noted that CSI needs to be reported for all frequency domain resources corresponding to the subband for which reporting is to be performed and that is indicated in the csi-ReportingBand. Therefore, when the network device indicates, by using the csi-ReportingBand, the subband for which reporting is to be performed, the network device indicates the frequency domain unit for which reporting is to be performed. A granularity of the frequency domain unit based on which the terminal device reports the first indication information may be a subband, or may be another granularity. In other words, regardless of whether a granularity of the frequency domain unit indicated in the ninth indication information is the same as the granularity of the foregoing frequency domain unit for which reporting is to be performed, the terminal device can determine, based on the ninth indication information, the quantity of frequency domain units for which reporting is to be performed and the locations of the frequency domain units.

Figure 5:
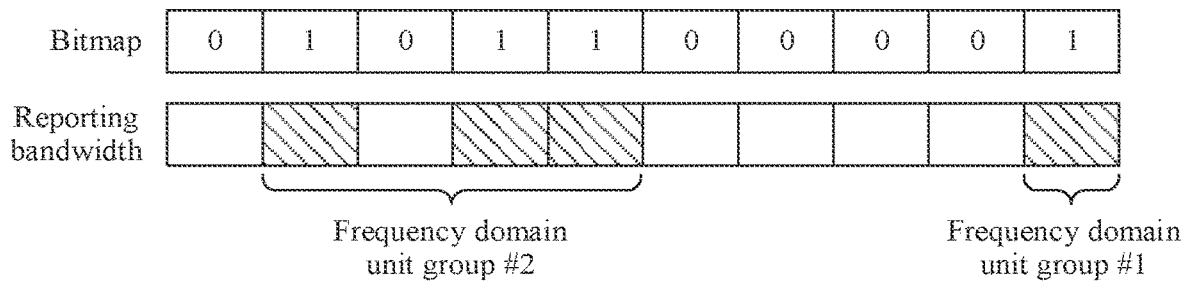
FIG. 5 is a schematic diagram of a bitmap, a reporting bandwidth, and frequency domain unit groups according to an embodiment of this application.

FIG. 5 shows an example of a bitmap, a reporting bandwidth, and frequency domain unit groups. As shown in the figure, the ninth indication information may indicate, by using the bitmap shown in FIG. 5, a quantity of subbands for which reporting is to be performed and locations of the subbands. The reporting bandwidth shown in the figure includes 10 subbands. Each subband may correspond to one indication bit of the bitmap. A subband corresponding to an indication bit that is set to "1" may be a subband for which reporting is to be performed. The frequency domain unit group may occupy a part or all of the reporting bandwidth. The frequency domain unit group shown in the figure occupies a part of the reporting bandwidth. A granularity of a frequency domain unit in the frequency domain unit group may be less than a granularity of a subband. The granularity of the frequency domain unit shown in the figure is ¼ of the granularity of the subband. In other words, a quantity of RBs included in each subband may be four times a quantity of RBs included in each frequency domain unit. In other words, α=4.

In addition, the frequency domain unit groups shown in FIG. 5 are obtained by grouping frequency domain units in the reporting bandwidth. Specifically, according to the foregoing rule, frequency domain units for which reporting is to be performed are grouped into two frequency domain unit groups, for example, a frequency domain unit group #1 and a frequency domain unit group #2 shown in the figure, by a plurality of frequency domain units for which no reporting needs to be performed.

It should be understood that FIG. 5 is merely an example for ease of understanding, and should not constitute any limitation on this application. A granularity of a frequency domain unit, a value relationship between a granularity of a frequency domain unit and a granularity of a subband, a relationship between a frequency domain unit group and a reporting bandwidth, and a quantity of subbands (namely, a length of a bitmap) included in the reporting bandwidth are not limited in this application. A specific grouping rule of the frequency domain unit groups is not limited in this application either.

After determining the R frequency domain unit groups, the terminal device may separately determine a spatial domain vector, a frequency domain vector, and a weighting coefficient for each frequency domain unit group.

Because frequency domain unit grouping mainly affects frequency domain vector selection, the R frequency domain unit groups may share same one or more spatial domain vectors, for example, same L spatial domain vectors, where L is a positive integer. In other words, a spatial domain vector used to construct a precoding vector of each frequency domain unit in any one of the R frequency domain unit groups may be determined by using the same L spatial domain vectors. Any two frequency domain unit groups correspond to a same spatial domain vector.

In an implementation, the terminal device may perform channel measurement based on a reference signal, for example, a CSI-RS, received on the reporting bandwidth, to determine a precoding vector that is at each transport layer and that corresponds to each frequency domain unit in the frequency domain unit group. It should be understood that for a specific method for determining, based on channel measurement, the precoding vector that is at each transport layer and that corresponds to each frequency domain unit, refer to the conventional technology. For brevity, detailed description of the specific process is omitted herein.

The terminal device may construct, based on a precoding vector of each frequency domain unit at a same transport layer, a space frequency matrix corresponding to the transport layer, and may perform spatial domain and frequency domain DFT on the space frequency matrix to determine L spatial domain vectors. For example, the spatial domain and frequency domain DFT may be performed on the space frequency matrix by using a formula $C=B_s^H H_z B_f$. $H_z$ represents a space frequency matrix constructed by using precoding vectors corresponding to frequency domain units at a $z^{th}$ ($1 \leq z \leq Z$ and z is an integer) transport layer in Z transport layers. $B_s$ represents a matrix constructed by using one spatial domain vector group in a predefined spatial domain vector set. $B_f$ represents a matrix constructed by using one frequency domain vector group in a predefined frequency domain vector set. C represents a coefficient matrix obtained through DFT.

It should be noted that herein, merely for ease of understanding, a specific process of performing, by the terminal device, spatial domain and frequency domain DFT on the space frequency matrix to determine the spatial domain vector and the following frequency domain vector and weighting coefficient is described by using one spatial domain vector group in the spatial domain vector set and one frequency domain vector group in the frequency domain vector set as an example. When the spatial domain vector set includes a plurality of spatial domain vector groups or the frequency domain vector set includes a plurality of frequency domain vector groups, a specific process of performing, by the terminal device, spatial domain and frequency domain DFT on the space frequency matrix to determine the spatial domain vector and the following frequency domain vector and weighting coefficient is similar thereto. For details, refer to the conventional technology. For brevity, detailed description of the specific process is omitted herein.

The terminal device may determine L relatively strong rows from the coefficient matrix C. For example, the terminal device may determine, based on a sum of squares of the moduli of elements in each row in the coefficient matrix C, L rows whose sums of squares of the moduli are relatively large. The L relatively strong rows in the coefficient matrix C may be used to determine L selected spatial domain vectors in the spatial domain vector group. For example, sequence numbers of the L relatively strong rows in the coefficient matrix C may be sequence numbers of L selected column vectors in the matrix $B_s$ constructed by using the spatial domain vector group. In this way, the L spatial domain vectors shared by the R frequency domain unit groups can be determined.

The quantity L of reported spatial domain vectors may be indicated by the network device by using signaling, or may be determined by the terminal device itself and reported to the network device, or may be predefined, for example, defined in a protocol. This is not limited in this application.

It should be understood that merely for ease of understanding, a possible implementation of determining, by the terminal device, the L spatial domain vectors is shown herein, but this should not constitute any limitation on this application. The terminal device may predetermine the L spatial domain vectors based on the reference signal received on the reporting bandwidth, or may determine all of the spatial domain vector, the frequency domain vector, and the weighting coefficient based on a reference signal received on each of the R frequency domain unit groups in the reporting bandwidth. A sequence of determining a spatial domain vector, a frequency domain vector, and a weighting coefficient is not limited in this application.

It should be further understood that the foregoing method for determining the L spatial domain vectors is merely an example, and should not constitute any limitation on this application. For example, the method for determining the L spatial domain vectors may be the same as a method for determining a spatial domain vector in a type II codebook feedback manner defined in the NR protocol TS 38.214 release 15 (R15). In addition, for example, the terminal device may alternatively determine the L spatial domain vectors by using an existing estimation algorithm such as a multiple signal classification algorithm (MUSIC), a Bartlett algorithm, or an estimation of signal parameters via rotation invariant technique (ESPRIT) algorithm. For brevity, example description is not provided herein.

It should be further understood that the L spatial domain vectors may be alternatively determined by the network device, for example, determined based on uplink-downlink channel reciprocity, or the L spatial domain vectors may be predefined. This is not limited in this application.

In this embodiment of this application, a length of the frequency domain vector reported by the terminal device for each of the R frequency domain unit groups may be determined based on a quantity of frequency domain units included in the frequency domain unit group, or may be determined based on a quantity of frequency domain units for which reporting is to be performed and that are included in the frequency domain unit group. Whether the length of the frequency domain vector is specifically determined based on the quantity of frequency domain units included in the frequency domain unit group or the quantity of frequency domain units for which reporting is to be performed and that are included in the frequency domain unit group may be defined in a protocol, or may be pre-agreed upon by the network device and the terminal device, provided that both parties determine the length of the frequency domain vector according to a same rule.

An $r^{th}$ frequency domain unit group is used as an example. For example, a length of a frequency domain vector reported by the terminal device for the $r^{th}$ frequency domain unit group may be determined based on a quantity of frequency domain units included in the $r^{th}$ frequency domain unit group, or may be determined based on a quantity of frequency domain units for which reporting is to be performed and that are included in the $r^{th}$ frequency domain unit group. Herein, a granularity of the quantity of frequency domain units may be the foregoing granularity of the frequency domain unit for which reporting is to be performed, and for example, may be a subband, or may be an RB, an RBG, a subcarrier, a PRG, or the like. This is not limited in this application. Regardless of a used length, the frequency domain unit for which reporting is to be performed may be determined based on the foregoing ninth indication information.

Specifically, for example, the length of the frequency domain vector reported for the $r^{th}$ frequency domain unit group may be the quantity of frequency domain units included in the $r^{th}$ frequency domain unit group, or may be greater than the quantity of frequency domain units in the $r^{th}$ frequency domain unit group. For example, the length of the frequency domain vector reported for the $r^{th}$ frequency domain unit group may be the quantity of frequency domain units for which reporting is to be performed and that are included in the $r^{th}$ frequency domain unit group, or may be greater than the quantity of frequency domain units for which reporting is to be performed and that are included in the $r^{th}$ frequency domain unit group.

A value of the length of the frequency domain vector is related to a length that is of a frequency domain vector and that is defined in a frequency domain vector set. If frequency domain vectors with different lengths are defined in the frequency domain vector set, the quantity of frequency domain units included in the $r^{th}$ frequency domain unit group or the quantity of frequency domain units for which reporting is to be performed and that are included in the $r^{th}$ frequency domain unit group may be directly used as the length of the frequency domain vector. If frequency domain vectors with only a limited quantity of lengths are defined in the frequency domain vector set, a minimum length that is in the frequency domain vector set and that is greater than the quantity of frequency domain units included in the $r^{th}$ frequency domain unit group may be determined as the length of the frequency domain vector, or a minimum length that is in the frequency domain vector set and that is greater than the quantity of frequency domain units for which reporting is to be performed and that are included in the $r^{th}$ frequency domain unit group may be determined as the length of the frequency domain vector.

The frequency domain unit groups shown in FIG. 3 are used as an example. In the figure, a length of a frequency domain vector determined for the frequency domain unit group #1 may be a minimum length greater than or equal to 9 in the frequency domain vector set, or may be a minimum length greater than or equal to 6 in the frequency domain vector set. A length of a frequency domain vector determined for the frequency domain unit group #2 may be a minimum length greater than or equal to 8 in the frequency domain vector set, or may be a minimum length greater than or equal to 7 in the frequency domain vector set. A length of a frequency domain vector determined for the frequency domain unit group #3 may be a minimum length greater than or equal to 10 in the frequency domain vector set, or may be a minimum length greater than or equal to 9 in the frequency domain vector set. A length of a frequency domain vector determined for the frequency domain unit group #4 may be a minimum length greater than or equal to 9 in the frequency domain vector set, or may be a minimum length greater than or equal to 7 in the frequency domain vector set.

It may be understood that at least two frequency domain unit groups in the R frequency domain unit groups include different quantities of frequency domain units for which reporting is to be performed, and the at least two frequency domain unit groups in the R frequency domain unit groups may also include different quantities of frequency domain units. Therefore, lengths of frequency domain vectors determined for different frequency domain unit groups may be different. In other words, the lengths of the frequency domain vectors determined for the frequency domain unit groups are independent of each other.

The quantity of frequency domain vectors to be reported by the terminal device for each of the R frequency domain unit groups may be indicated by the network device by using signaling, or may be determined by the terminal device itself and reported to the network device, or may be predefined, for example, defined in a protocol. This is not limited in this application.

Optionally, the method 200 further includes: The terminal device receives second indication information, where the second indication information is used to indicate a quantity of to-be-reported frequency domain vectors that is configured for each of the R frequency domain unit groups. Correspondingly, the network device sends the second indication information.

For example, the network device may determine, based on an uplink channel measurement result and uplink-downlink channel reciprocity, the quantity of frequency domain vectors that need to be reported for each frequency domain unit group. The network device may notify, in advance by using signaling, the terminal device of the quantity of frequency domain vectors that need to be reported for each frequency domain unit group. For ease of description, in the following specification, the quantity of to-be-reported frequency domain vectors that is configured by the network device for each of the R frequency domain unit groups is denoted as $M_r$, a value of r is selected from 1 to R in a traversal manner, and both r and $M_r$ are positive integers.

For example, the second indication information may be carried in higher layer signaling such as an RRC message or a MAC CE. For example, the second indication information may be alternatively carried in physical layer signaling such as DCI. This is not limited in this application.

Optionally, the method 200 further includes: The terminal device sends fourth indication information, where the fourth indication information is used to indicate a quantity of frequency domain vectors reported for each of the R frequency domain unit groups. Correspondingly, the network device receives the fourth indication information.

In other words, the terminal device itself may determine the quantity of frequency domain vectors to be reported for each frequency domain unit group. Herein, for ease of description, the quantity of frequency domain vectors reported by the terminal device for each of the R frequency domain unit groups is denoted as $M_r'$, a value of r is selected from 1 to R in a traversal manner, and both r and $M_r'$ are positive integers.

The terminal device may determine, according to a predefined rule, the quantity of frequency domain vectors to be reported for each frequency domain unit group. For example, to-be-reported frequency domain vectors are evenly allocated to the R frequency domain unit groups based on a sum M (to be described in detail in the following specification) of quantities of to-be-reported frequency domain vectors that is indicated by the network device.

Alternatively, the terminal device may determine the quantity of frequency domain vectors to be reported for each of the R frequency domain unit groups, based on factors such as feedback precision and a quantization error, a result of channel measurement performed based on a reference signal received on the frequency domain unit group, and the sum M of the quantities of to-be-reported frequency domain vectors that is indicated by the network device. For example, the M frequency domain vectors are allocated to the R frequency domain unit groups by using an existing algorithm, so that a quantization error between a channel matrix constructed by using the frequency domain vectors respectively reported for the R frequency domain unit groups and a channel matrix obtained through measurement is the smallest.

It should be understood that the specific method for determining, by the terminal device, the quantity of frequency domain vectors to be reported for each frequency domain unit group in the foregoing example is merely an example, and should not constitute any limitation on this application. Determining, by the ter final device, the quantity of to-be-reported frequency domain vectors for each frequency domain unit group is internal implementation behavior of the device, and may be implemented by using an existing algorithm, or may be determined by using a predefined rule. The specific method for determining, by the terminal device, the quantity of frequency domain vectors to be reported for each frequency domain unit group is not limited in this application.

The terminal device may indicate, to the network device in different manners, the quantity of frequency domain vectors reported for each frequency domain unit group.

In an implementation, the terminal device may separately report, to the network device in a predefined sequence, the quantities of frequency domain vectors respectively reported for the R frequency domain unit groups. For example, the corresponding quantities $M_1'$ to $M_R'$ of frequency domain vectors are indicated according to a sequence of the R frequency domain unit groups that are obtained by dividing the reporting bandwidth from the first frequency domain unit to the last frequency domain unit.

In another implementation, the terminal device may report, to the network device, a combination of the quantities $M_1'$ to $M_R'$ of frequency domain vectors respectively reported for the R frequency domain unit groups. For example, the terminal device may report, to the network device in a form of an index, the combination of the quantities $M_1'$ to $M_R'$ of frequency domain vectors respectively reported for the R frequency domain unit groups. In this implementation, the terminal device and the network device may prestore a correspondence between a plurality of indexes and a plurality of combinations, each index corresponds to one combination of R values, and any two indexes correspond to two different combinations. Herein, that two combinations are different may include: values included in the two combinations are partially different, or values included in the two combinations are completely different, or values included in the two combinations are the same but are in different sequences.

For example, R is 4, one combination may include values {4, 2, 2, 2}, another combination may include values {4, 4, 2, 2}, still another combination may include values {4, 2, 4, 2}, and yet another combination may include values {6, 4, 2, 2}. These four combinations are different from each other. It should be understood that several combinations of quantities of frequency domain vectors are shown herein merely for ease of understanding, and should not constitute any limitation on this application.

R values in each combination correspond to quantities of frequency domain vectors respectively reported for the R frequency domain unit groups. When the terminal device indicates a combination by using an index, R values in the indicated combination respectively represent the quantities $M_1'$ to $M_R'$ of frequency domain vectors respectively reported for the R frequency domain unit groups.

It should be noted that in this embodiment of this application, the quantity $M_r$ of to-be-reported frequency domain vectors that is configured for the $r^{th}$ frequency domain unit group and that is indicated in the second indication information may be a quantity of frequency domain vectors that need to be reported for the $r^{th}$ frequency domain unit group, and the quantity $M_r'$ that is of frequency domain vectors reported for the $r^{th}$ frequency domain unit group and that is indicated in the fourth indication information may be a quantity of frequency domain vectors actually reported for the $r^{th}$ frequency domain unit group. The two quantities are not associated and may be the same or different. This is not limited in this application.

It should be understood that the fourth indication information and the first indication information may be carried in same signaling, for example, in different fields in the same signaling, or may be carried in different signaling. This is not limited in this application.

Further, when the quantity of frequency domain vectors to be reported for each frequency domain unit group is determined by the terminal device itself, the network device may further indicate, in advance by using signaling, the total quantity M of frequency domain vectors that need to be reported for the R frequency domain unit groups.

Optionally, the method further includes: The terminal device receives fifth indication information, where the fifth indication information is used to indicate the sum of quantities of to-be-reported frequency domain vectors that is configured for the R frequency domain unit groups. Correspondingly, the network device sends the fifth indication information.

For ease of description in the following specification, the sum of the quantities of to-be-reported frequency domain vectors that is configured by the network device for the R frequency domain unit groups is denoted as M, $$M = \sum_{r=1}^{R} M_r',$$

and M is a positive integer.

For example, the fifth indication information may be carried in higher layer signaling such as an RRC message or a MAC CE. For example, the fifth indication information may be alternatively carried in physical layer signaling such as DCI. This is not limited in this application.

It may be understood that when the network device indicates, by using the second indication information, the quantity of to-be-reported frequency domain vectors that is configured for each of the R frequency domain unit groups, the network device implicitly indicates the sum of the quantities of to-be-reported frequency domain vectors that is configured for the R frequency domain unit groups. Therefore, the network device may no longer indicate, by using the fifth indication information, the sum of the quantities of to-be-reported frequency domain vectors that need to be reported for the R frequency domain unit groups.

It should be noted that for ease of distinguishing in the foregoing specification, $M_1$ to $M_R$ and $M_1'$ to $M_R'$ are used to distinguish between the reporting quantity indicated by the network device and the reporting quantity determined by the terminal device. However, actually, it may be predefined in a protocol or agreed upon in advance between the network device and the terminal device whether the network device indicates $M_1$ to $M_R$ or the terminal device reports $M_1'$ to $M_R'$. In other words, the quantity of frequency domain vectors to be reported for each frequency domain unit group is determined by the network device or the terminal device. After one of the network device and the terminal device determines the quantity of frequency domain vectors to be reported for each frequency domain unit group, the party may notify the other party by using signaling. Regardless of which party determines the quantity of to-be-reported frequency domain vectors, the terminal device can report a corresponding quantity of frequency domain vectors based on the reporting quantity. For ease of description in the following specification, unless otherwise specified, the quantities of frequency domain vectors reported by the terminal device for the R frequency domain unit groups are denoted as $M_1$ to $M_R$.

A quantity of weighting coefficients reported by the terminal device for each of the R frequency domain unit groups may be indicated by the network device by using signaling, or may be determined by the terminal device itself and reported to the network device, or may be predefined, for example, defined in a protocol. This is not limited in this application.

Optionally, the method 200 further includes: The terminal device receives third indication information, where the third indication information is used to indicate a quantity of to-be-reported weighting coefficients that is configured for each of the R frequency domain unit groups. Correspondingly, the network device sends the third indication information.

For example, the network device may determine, based on an uplink channel measurement result and uplink-downlink channel reciprocity, the quantity of weighting coefficients that need to be reported for each frequency domain unit group. The network device may notify, in advance by using signaling, the terminal device of the quantity of weighting coefficients that need to be reported for each frequency domain unit group. For ease of description in the following specification, the quantity of to-be-reported weighting coefficients that is configured by the network device for each of the R frequency domain unit groups is denoted as $T_r$, a value of r is selected from 1 to R in a traversal manner, and both r and $T_r$ are positive integers.

For example, the third indication information may be carried in higher layer signaling such as an RRC message or a MAC CE. For example, the third indication information may be alternatively carried in physical layer signaling such as DCI. This is not limited in this application.

If the quantities of frequency domain vectors to-be-reported for the R frequency domain unit groups are also indicated by the network device, the second indication information and the third indication information may be carried in same signaling, or may be carried in different signaling. This is not limited in this application.

It should be noted that when the terminal device determines a weighting coefficient based on the quantity of to-be-reported weighting coefficients that is indicated by the network device, the determined weighting coefficient may include one or more elements with a relatively small amplitude, for example, a quantized value of the amplitude is zero. The terminal device may not report a weighting coefficient in which a quantized value of an amplitude is zero. Therefore, a quantity of weighting coefficients actually reported by the terminal device may be less than or equal to the quantity of to-be-reported weighting coefficients that is indicated by the network device.

Therefore, after determining the to-be-reported weighting coefficient, the terminal device may further report, to the network device, a quantity of weighting coefficients reported for each of the R frequency domain unit groups, or a total quantity of weighting coefficients reported for the R frequency domain unit groups.

Optionally, the method 200 further includes: The terminal device sends sixth indication information, where the sixth indication information is used to indicate the quantity of weighting coefficients reported for each of the R frequency domain unit groups. Correspondingly, the network device receives the sixth indication information.

The terminal device may determine, based on an indication of the network device such as the third indication information, the weighting coefficient to be reported for each frequency domain unit group, and further indicate the quantity of actually reported weighting coefficients. Alternatively, the terminal device itself may predetermine the quantity of frequency domain vectors that need to be reported for each frequency domain unit group, determine a to-be-reported weighting coefficient for each frequency domain unit group based on the determined quantity, and further indicate the quantity of actually reported weighting coefficients. Herein, for ease of description, the quantity of frequency domain vectors reported by the network device for each of the R frequency domain unit groups is denoted as $K_r$, a value of r is selected from 1 to R in a traversal manner, and both r and $K_r$ are positive integers.

A specific method for determining, by the terminal device itself, the quantity of weighting coefficients that need to be reported for each frequency domain unit group may be similar to the specific method for determining, by the terminal device, the quantity of frequency domain vectors that need to be reported for each frequency domain unit group. For brevity, details are not described herein again.

As described above, the weighting coefficient determined by the terminal device may include one or more elements with a relatively small amplitude, for example, a quantized value of the amplitude is zero. The terminal device may not report a weighting coefficient in which a quantized value of an amplitude is zero. Therefore, the quantity of weighting coefficients actually reported by the terminal device may be less than or equal to the predetermined quantity of to-be-reported weighting coefficients.

The terminal device may indicate, to the network device in different manners, the quantity of weighting coefficients reported for each frequency domain unit group.

In an implementation, the terminal device may report, to the network device in a predefined sequence, the quantities of weighting coefficients reported for the R frequency domain unit groups. For example, the corresponding quantities $K_1$ to $K_R$ of weighting coefficients are indicated according to a sequence of the R frequency domain unit groups that are obtained by dividing the reporting bandwidth from the first frequency domain unit to the last frequency domain unit.

In another implementation, the terminal device may report, to the network device, a combination of the quantities $K_1$ to $K_R$ of weighting coefficients respectively reported for the R frequency domain unit groups. For example, the terminal device may report, to the network device in a form of an index, the combination of the quantities $K_1$ to $K_R$ of weighting coefficients respectively reported for the R frequency domain unit groups. In this implementation, the terminal device and the network device may prestore a correspondence between a plurality of indexes and a plurality of combinations, each index corresponds to one combination of R values, and any two indexes correspond to two different combinations. Herein, that two combinations are different may include: values included in the two combinations are partially different, or values included in the two combinations are completely different, or values included in the two combinations are the same but are in different sequences.

R values in each combination correspond to the quantities of weighting coefficients that respectively need to be reported for the R frequency domain unit groups. When the terminal device indicates a combination by using an index, R values in the indicated combination respectively represent the quantities $K_1$ to $K_R$ of weighting coefficients respectively reported for the R frequency domain unit groups.

In still another implementation, the terminal device may indicate, in a predefined sequence by using a bitmap, the quantities of weighting coefficients reported for the R frequency domain unit groups. For example, for the $r^{th}$ frequency domain unit group, space frequency vector pairs constructed by using L spatial domain vectors and $M_r$ frequency domain vectors correspond, in a predefined sequence, to a bitmap with a length of $L \times M_r$ bits, and each bit corresponds to one space frequency vector pair, to indicate whether the corresponding space frequency vector pair is selected. The selected space frequency vector pair is a space frequency vector pair used to construct a precoding vector. A weighting coefficient needs to be reported for the selected space frequency vector pair.

For example, when a bit is set to "0", it indicates that a corresponding space frequency vector pair is not selected; when a bit is set to 1, it indicates that a corresponding space frequency vector pair is selected. Therefore, a total quantity of bits "1" in the bitmap may represent a quantity of space frequency vector pairs selected for the $r^{th}$ frequency domain unit group, namely, the quantity of weighting coefficients reported for the $r^{th}$ frequency domain unit group.

For the R frequency domain unit groups, the terminal device may indicate, respectively by using R bitmaps, the quantities of weighting coefficients respectively reported for the R frequency domain unit groups, or indicate, by using one bitmap, a total quantity of weighting coefficients reported for the R frequency domain unit groups. When the terminal device indicates, by using one bitmap, the total quantity of weighting coefficients reported for the R frequency domain unit groups, for example, the R bitmaps may be connected in a sequence from a first frequency domain unit group to an $R^{th}$ frequency domain unit group, to obtain a bitmap with a length of $L \times M$ bits.

It should be noted that in this embodiment of this application, the quantity $T_r$ of to-be-reported weighting coefficients that is configured for the $r^{th}$ frequency domain unit group and that is indicated in the third indication information may be a quantity of weighting coefficients that need to be reported for the $r^{th}$ frequency domain unit group, and the quantity $K_r$ that is of weighting coefficients reported for the $r^{th}$ frequency domain unit group and that is indicated in the sixth indication information may be a quantity of weighting coefficients actually reported for the $r^{th}$ frequency domain unit group.

When the network device indicates, by using the third indication information, the quantity of weighting coefficients to be reported for each of the R frequency domain unit groups, the quantity that is of weighting coefficients reported for each frequency domain unit group and that is indicated in the sixth indication information is related thereto. For example, for the $r^{th}$ frequency domain unit group, $T_r \geq K_r$.

When the network device does not indicate, to the terminal device, the weighting coefficient for each of the R frequency domain unit groups, $T_r$ and $K_r$ are not associated, and may be the same or different. This is not limited in this application.

It should be understood that, the sixth indication information and the fourth indication information and/or the first indication information may be carried in same signaling, for example, in different fields in the same signaling, or may be carried in different signaling. This is not limited in this application.

Optionally, the method 200 further includes: The terminal device sends seventh indication information, where the seventh indication information is used to indicate a total quantity of weighting coefficients reported for the R frequency domain unit groups. Correspondingly, the network device receives the seventh indication information.

For ease of description, in the following specification, the total quantity of weighting coefficients reported by the terminal device for the R frequency domain unit groups is denoted as K, $$K = \sum_{r=1}^{R} K_r.$$

and K is a positive integer.

The terminal device may choose to report the seventh indication information or the sixth indication information. In other words, the terminal device may report, to the network device, the total quantity of weighting coefficients actually reported for the R frequency domain unit groups, or may report, to the network device, the quantity of weighting coefficients actually reported for each frequency domain unit group.

For example, the terminal device may indicate, to the network device by using a binary number, the total quantity of weighting coefficients reported for the R frequency domain unit groups, or may indicate, to the network device by using a bitmap, the total quantity of weighting coefficients reported for the R frequency domain unit groups. A specific method for indicating, by the terminal device, the quantity of weighting coefficients has been described in detail in the foregoing specification. For brevity, details are not described herein again.

It should be understood that the seventh indication information and the fourth indication information and/or the first indication information may be carried in same signaling, for example, in different fields in the same signaling, or may be carried in different signaling. This is not limited in this application.

Further, when the quantity of weighting coefficients to be reported for each frequency domain unit group is determined by the terminal device itself, the network device may further indicate, in advance by using signaling, the total quantity of weighting coefficients that need to be reported for the R frequency domain unit groups.

Optionally, the method 200 further includes: The terminal device receives eighth indication information, where the eighth indication information is used to indicate the sum of quantities of to-be-reported weighting coefficients that is configured for the R frequency domain unit groups. Correspondingly, the network device sends the eighth indication information.

For ease of description, in the following specification, the sum of the quantities of to-be-reported weighting coefficients that is configured by the network device for the R frequency domain unit groups is denoted as T, $$T \geq \sum_{r=1}^{R} K_r,$$

and T is a positive integer. In other words, $T \geq K$.

For example, the eighth indication information may be carried in higher layer signaling such as an RRC message or a MAC CE. For example, the fifth indication information may be alternatively carried in physical layer signaling such as DCI. This is not limited in this application.

It may be understood that when the network device indicates, by using the third indication information, the quantity of to-be-reported weighting coefficients that is configured for each of the R frequency domain unit groups, the network device implicitly indicates the sum of the quantities of to-be-reported weighting coefficients that is configured for the R frequency domain unit groups. Therefore, the network device may no longer indicate, by using the eighth indication information, the sum of the quantities of weighting coefficients that need to be reported for the R frequency domain unit groups.

In addition, if the network device indicates, to the terminal device by using the fifth indication information, the sum of the quantities of frequency domain vectors that need to be reported for the R frequency domain unit groups, the eighth indication information and the fifth indication information may be carried in same signaling, or may be carried in different signaling. This is not limited in this application.

The following describes in detail a specific process of determining, by the terminal device, the frequency domain vector and the weighting coefficient for each frequency domain unit group.

In an implementation, the terminal device may perform channel measurement based on a reference signal, for example, a CSI-RS, received on each frequency domain unit group, to determine a precoding vector that is at each transport layer and that corresponds to each frequency domain unit in the frequency domain unit group. It should be understood that for a specific method for determining, based on channel measurement, the precoding vector that is at each transport layer and that corresponds to each frequency domain unit, refer to the conventional technology. For brevity, detailed description of the specific process is omitted herein.

For the $r^{th}$ frequency domain unit group in the R frequency domain unit groups, the terminal device may construct, based on a precoding vector of each frequency domain unit in the $r^{th}$ frequency domain unit group at a same transport layer, a space frequency matrix corresponding to the transport layer, and may perform spatial domain and frequency domain DFT on the space frequency matrix to obtain $M_r$ frequency domain vectors and $K_r$ weighting coefficients. For example, the spatial domain and frequency domain DFT may be performed on the space frequency matrix by using a formula $C_r = U_s^H H_{r,z} B_f$. $H_{r,z}$ represents a space frequency matrix constructed by using a precoding vector corresponding to each frequency domain unit in the $r^{th}$ frequency domain unit group at a $z^{th}$ ($1 \leq z \leq Z$, and z is an integer) transport layer in Z transport layers. $U_s$ represents a matrix constructed by using the foregoing L spatial domain vectors, and a dimension of the matrix may be $L \times N_s$. $B_f$ represents a matrix constructed by using one frequency domain vector group in a predefined frequency domain vector set. $C_r$ represents a coefficient matrix obtained through DFT.

It should be noted that herein, merely for ease of understanding, a specific process of performing, by the terminal device, frequency domain DFT on the space frequency matrix to determine the frequency domain vector and the following spatial domain vector and weighting coefficient is described by using one frequency domain vector group in the frequency domain vector set as an example. When the frequency domain vector set includes a plurality of frequency domain vector groups, a specific process of performing, by the terminal device, spatial domain and frequency domain DFT on the space frequency matrix to determine the frequency domain vector and the weighting coefficient is similar thereto. For details, refer to the conventional technology. For brevity, detailed description of the specific process is omitted herein.

The terminal device may determine $M_r$ relatively strong columns from the coefficient matrix $C_r$. For example, the terminal device may determine, based on a sum of squares of the moduli of elements in each column in the coefficient matrix $C_r$, $M_r$ columns whose sums of squares of the moduli are relatively large. The $M_r$ relatively strong columns in the coefficient matrix $C_r$ may be used to determine $M_r$ selected frequency domain vectors in the frequency domain vector group. For example, sequence numbers of the $M_r$ relatively strong columns in the coefficient matrix $C_r$ may be sequence numbers of $M_r$ selected column vectors in the matrix $B_f$ constructed by using the frequency domain vector group. In this way, the $M_r$ frequency domain vectors corresponding to the $r^{th}$ frequency domain unit group can be determined.

Further, the $M_r$ relatively strong columns in the coefficient matrix $C_r$ may be extracted to construct a new matrix $C_r'$, and a dimension of the matrix may be $L \times M_r$. $L \times M_r$ elements in the matrix $C_r'$ may correspond to the $L \times M_r$ space frequency vector pairs constructed by using the L spatial domain vectors and the $M_r$ frequency domain vectors, each element corresponds to one spatial domain vector and one frequency domain vector, and each element is a weighting coefficient of a space frequency vector pair constructed by using the corresponding spatial domain vector and the corresponding frequency domain vector.

The terminal device may further select $T_r$ relatively strong weighting coefficients from the $L \times M_r$ weighting coefficients based on the foregoing predetermined quantity of weighting coefficients to be reported for the $r^{th}$ frequency domain unit group, for example, the quantity is indicated by the network device or determined by the terminal device itself, and is denoted as $T_r$. When the $T_r$ weighting coefficients include a weighting coefficient in which a quantized value of an amplitude is zero, the weighting coefficient may not be reported. Therefore, a quantity $K_r$ of weighting coefficients actually reported by the terminal device may be less than or equal to $T_r$.

It should be understood that merely for ease of understanding, a possible implementation of determining, by the terminal device, the frequency domain vector and the weighting coefficient that are to be reported for the $r^{th}$ frequency domain unit group is shown in the foregoing specification, but this should not constitute any limitation on this application. A specific method for determining, by the terminal device, the frequency domain vector and the weighting coefficient that are to be reported for the $r^{th}$ frequency domain unit group belongs to internal implementation of the device, and may be implemented by using an existing algorithm. A specific implementation of determining, by the terminal device, the frequency domain vector and the weighting coefficient that are to be reported for each frequency domain unit group is not limited in this application.

It should be further understood that the step of determining, by the terminal device, the frequency domain vector and the weighting coefficient for each frequency domain unit group may be performed simultaneously with the foregoing step of determining the quantity of frequency domain vectors to be reported for each frequency domain unit group and the quantity of weighting coefficients to be reported for each frequency domain unit group, or may be performed after the quantity of frequency domain vectors to be reported for each frequency domain unit group and the quantity of weighting coefficients to be reported for each frequency domain unit group are determined. An execution sequence of the steps depends on an implementation algorithm used by the terminal device. The execution sequence of the two steps is not limited in this application. Merely for ease of description and understanding, the step of determining, by the terminal device, the quantity of frequency domain vectors to be reported for each frequency domain unit group and the quantity of weighting coefficients to be reported for each frequency domain unit group and the step of determining, by the terminal device, the frequency domain vector and the weighting coefficient are described separately in this specification, and this should not constitute any limitation on the execution sequence.

It should be further understood that the step of determining, by the terminal device, the frequency domain vector and the weighting coefficient for each frequency domain unit group may be performed simultaneously with the step of determining the L spatial domain vectors, or may be performed after the step of determining the L spatial domain vectors. An execution sequence of the steps depends on an implementation algorithm used by the terminal device. The execution sequence of the two steps is not limited in this application. Merely for ease of understanding, a possible implementation of determining, by the terminal device, the L spatial domain vectors is shown in the foregoing specification, and this should not constitute any limitation on this application.

After determining the spatial domain vector, the frequency domain vector, and the weighting coefficient, the terminal device may report the spatial domain vector, the frequency domain vector, and the weighting coefficient to the network device by using the first indication information.

There are a plurality of methods for reporting, by the terminal device, the spatial domain vector, the frequency domain vector, and the weighting coefficient to the network device by using the first indication information.

For example, the terminal device may indicate the L spatial domain vectors by using an index of a combination of the L spatial domain vectors, or may separately indicate the L spatial domain vectors by using respective indexes of the L spatial domain vectors. When a spatial domain vector set is extended to a plurality of subsets by using an oversampling factor, the terminal device may further indicate an index of a subset to which the L spatial domain vectors belong.

For another example, for the $r^{th}$ frequency domain unit group, the terminal device may indicate, by using an index of a combination of the $M_r$ frequency domain vectors, the $M_r$ frequency domain vectors reported for the $r^{th}$ frequency domain unit group, or may indicate the $M_r$ frequency domain vectors by using respective indexes of the $M_r$ frequency domain vectors. When a frequency domain vector set is extended to a plurality of subsets by using an oversampling factor, the terminal device may further indicate an index of a subset to which the $M_r$ frequency domain vectors belong.

For another example, for the $r^{th}$ frequency domain unit group, the terminal device may indicate the $K_r$ weighting coefficients in a normalization manner, or may indicate the $K_r$ weighting coefficients by using a quantized value of each of the $K_r$ weighting coefficients or an index of the quantized value.

It should be understood that for the specific method for indicating, by the terminal device, the spatial domain vector, the frequency domain vector, and the weighting coefficient to the network device by using the first indication information, refer to the conventional technology. For brevity, details are not described herein.

It should be further understood that the terminal device may report the frequency domain vectors and the weighting coefficients for the R frequency domain unit groups in a pre-agreed sequence. For example, the frequency domain vectors and the weighting coefficients are indicated according to a sequence from the first frequency domain unit group to the $R^{th}$ frequency domain unit group. For another example, first, the frequency domain vectors are indicated according to a sequence from the first frequency domain unit group to the $R^{th}$ frequency domain unit group, and then the weighting coefficients are indicated according to the sequence from the first frequency domain unit group to the $R^{th}$ frequency domain unit group. For brevity, examples are not provided one by one herein. The network device may parse the received first indication information according to the pre-agreed sequence, to determine the frequency domain vector and the weighting coefficient that are reported for each of the R frequency domain unit groups.

Further, the first indication information is further used to indicate locations of space frequency vector pairs corresponding to the reported weighting coefficients. When a location of a space frequency vector pair corresponding to each weighting coefficient is indicated, a correspondence between each weighting coefficient and the space frequency vector pair may be indirectly indicated, in other words, a spatial domain vector and a frequency domain vector that correspond to each weighting coefficient may be indirectly indicated.

In this embodiment of this application, the locations of the space frequency vector pairs corresponding to the weighting coefficients reported for the R frequency domain unit groups may be respectively indicated by using R fields corresponding to the R frequency domain unit groups, or may be indicated by using one field. This is not limited in this application.

Optionally, the first indication information is further used to indicate a location of a space frequency vector pair corresponding to the weighting coefficient reported for each frequency domain unit group. $K_r$ weighting coefficients are reported for the $r^{th}$ frequency domain unit group, $K_r$ space frequency vector pairs corresponding to the $K_r$ weighting coefficients are selected from $L \times M_r$ space frequency vector pairs, and the $L \times M_r$ space frequency vector pairs are determined based on the $M_r$ frequency domain vectors reported for the $r^{th}$ frequency domain unit group and the L spatial domain vectors. When being used to indicate the locations of the space frequency vector pairs corresponding to the $K_r$ weighting coefficients, the first indication information is specifically used to indicate relative locations of the $K_r$ space frequency vector pairs in the $L \times M_r$ space frequency vector pairs.

An $r^{th}$ transport layer is used as an example. $K_r$ space frequency vector pairs corresponding to $K_r$ weighting coefficients reported by the terminal device for the $r^{th}$ transport layer may be one or more space frequency vector pairs selected from the $L_r \times M_r$ space frequency vector pairs constructed by using the L spatial domain vectors and the $M_r$ frequency domain vectors.

In an implementation, the terminal device may indicate the locations of the $K_r$ space frequency vector pairs by using an index of a combination of the $K_r$ space frequency vector pairs in the $L \times M_r$ space frequency vector pairs.

Specifically, the terminal device may predetermine a correspondence between a plurality of combinations of a plurality of space frequency vector pairs and a plurality of indexes based on the $L \times M_r$ space frequency vector pairs obtained by combining the L spatial domain vectors and the $M_r$ frequency domain vectors. Each combination may correspond to one index, and any two combinations include different space frequency vector pairs. The $K_r$ space frequency vector pairs may be one of the plurality of combinations, or may be close to one of the plurality of combinations. The terminal device may indicate the $K_r$ space frequency vector pairs by indicating the index of the combination of the $K_r$ space frequency vector pairs. For example, indication overheads brought by the $K_r$ space frequency vector pairs may be $\lceil \log_2 C_{L \times M_r}^{K_r} \rceil$ bits.

Based on a same manner, the terminal device may indicate, by using R indexes corresponding to the R frequency domain unit groups, space frequency vector pairs reported for the frequency domain unit groups. For example, indication overheads brought by this may be $$\sum_{r=1}^{R} \lceil \log_2 C_{L \times M_r}^{K_r} \rceil \text{ bits.}$$

In this implementation, the terminal device may indicate, to the network device, the quantity of weighting coefficients reported for each frequency domain unit group.

In another implementation, the terminal device may alternatively indicate the locations of the $K_r$ selected space frequency vector pairs in the $L \times M_r$ space frequency vector pairs by using a bitmap with a length of $L \times M_r$ bits. The terminal device may indicate, by using each bit in the bitmap, whether a corresponding space frequency vector pair is selected. A specific method for indicating, by the terminal device, the $K_r$ selected space frequency vector pairs by using the bitmap has been described in detail in the foregoing specification. For brevity, details are not described herein again.

Based on a same manner, the terminal device may indicate, by using R bitmaps corresponding to the R frequency domain unit groups, the space frequency vector pairs corresponding to the weighting coefficients reported for the frequency domain unit groups. For example, indication overheads brought by this may be $$L \times \sum_{r=1}^{R} M_r \text{ bits,}$$

namely, L×M bits.

In this implementation, the terminal device may indicate, by using the bitmap, both the quantity of weighting coefficients reported for each frequency domain unit group and the location of the corresponding space frequency vector pair. Therefore, when the sixth indication information is a bitmap, the sixth indication information and the first indication information may be same indication information.

Optionally, the first indication information is further used to indicate locations of space frequency vector pairs corresponding to the weighting coefficients reported for the R frequency domain unit groups. K weighting coefficients are reported for the R frequency domain unit groups, K space frequency vector pairs corresponding to the K weighting coefficients are selected from L×M space frequency vector pairs, and the L×M space frequency vector pairs are determined by using the M frequency domain vectors reported for the R frequency domain unit groups and the L spatial domain vectors. When being used to indicate the locations of the space frequency vector pairs corresponding to the K weighting coefficients, the first indication information is specifically used to indicate relative locations of the K space frequency vector pairs in the L×M space frequency vector pairs.

In an implementation, the terminal device may indicate the locations of the K space frequency vector pairs by using an index of a combination of the K space frequency vector pairs in the L×M space frequency vector pairs.

Specifically, the terminal device may predetermine a correspondence between a plurality of combinations of a plurality of space frequency vector pairs and a plurality of indexes based on the L×M space frequency vector pairs obtained by combining the L spatial domain vectors and the (namely, $$\sum_{r=1}^{R} M_r)$$

frequency domain vectors. Each combination may correspond to one index, and any two combinations include different space frequency vector pairs. The K space frequency vector pairs may be one of the plurality of combinations, or may be close to one of the plurality of combinations. The terminal device may indicate the K space frequency vector pairs by indicating the index of the combination of the K space frequency vector pairs. For example, indication overheads brought by the K space frequency vector pairs may be $\lceil \log_2 C_{L\times M}^K \rceil$ bits.

In this implementation, the terminal device may indicate, to the network device, the total quantity of weighting coefficients reported for the R frequency domain unit groups.

In another implementation, the terminal device may alternatively indicate the locations of the K selected space frequency vector pairs in the L×M space frequency vector pairs by using a bitmap with a length of L×M bits. The terminal device may indicate, by using each bit in the bitmap, whether a corresponding space frequency vector pair is selected. For example, the bitmap may be obtained by connecting the foregoing R bitmaps corresponding to the R frequency domain unit groups. A specific method for indicating, by the terminal device, the locations of the K selected space frequency vector pairs by using the bitmap with a length of L×M bits is similar to a specific method for indicating, by the terminal device, the locations of the $K_r$ selected space frequency vector pairs by using the bitmap with a length of L×$M_r$ bits. The specific method for indicating, by the terminal device, the locations of the $K_r$ selected space frequency vector pairs by using the bitmap with a length of L×$M_r$ bits has been described in detail in the foregoing specification. Therefore, for brevity, details are not described herein again.

In this implementation, the terminal device may indicate, by using the bitmap, both the quantity of weighting coefficients reported for each frequency domain unit group and the location of the corresponding space frequency vector pair. Therefore, when the seventh indication information is a bitmap, the seventh indication information and the first indication information may be same indication information.

It should be understood that the foregoing method for indicating the location of the space frequency vector pair corresponding to each weighting coefficient is merely an example, and should not constitute any limitation on this application. A specific method for indicating, by the terminal device, the space frequency vector pair corresponding to each weighting coefficient is not limited in this application.

It should be further understood that the foregoing specific process for determining, by the terminal device, the spatial domain vectors, the frequency domain vectors, and the weighting coefficients for the R frequency domain unit groups is merely an example, and should not constitute any limitation on this application.

When a quantity of polarization directions of a transmit antenna is greater than 1, for example, the quantity of polarization directions is 2, the terminal device may determine, for the R frequency domain unit groups based on the foregoing method, spatial domain vectors, frequency domain vectors, weighting coefficients, and locations of space frequency vector pairs corresponding to the weighting coefficients. Alternatively, the terminal device may use, in two polarization directions, the foregoing spatial domain vectors and frequency domain vectors that are determined for the R frequency domain unit groups, in other words, the L spatial domain vectors and the M frequency domain vectors that are determined by using the foregoing method are shared in the two polarization directions. The terminal device may further determine, for the R frequency domain unit groups in each polarization direction, weighting coefficients and locations of space frequency vector pairs corresponding to the weighting coefficients.

When a quantity of transport layers is greater than 1, the terminal device may determine, for the R frequency domain unit groups based on the foregoing method, spatial domain vectors, frequency domain vectors, weighting coefficients, and locations of space frequency vector pairs corresponding to the weighting coefficients. Alternatively, the terminal device may use, for a plurality of transport layers, the foregoing spatial domain vectors and frequency domain vectors that are determined for the R frequency domain unit groups, in other words, the L spatial domain vectors and the M frequency domain vectors that are determined by using the foregoing method are shared for the plurality of transport layers. The terminal device may further determine, for the frequency domain unit groups at each transport layer, weighting coefficients and locations of space frequency vector pairs corresponding to the weighting coefficients.

When a quantity of polarization directions of a transmit antenna is greater than 1 and/or a quantity of transmission layers is greater than 1, the first indication information may include spatial domain vectors, frequency domain vectors, weighting coefficients, and locations of space frequency vector pairs corresponding to the weighting coefficient that are respectively determined for the plurality of polarization directions and/or the plurality of transport layers. When spatial domain vectors and frequency domain vectors are shared for the plurality of polarization directions or the plurality of transport layers, the L spatial domain vectors in the first indication information may be indicated by using a same field, need to be indicated only once, and do not need to be indicated for the plurality of polarization directions and/or the plurality of transport layers for a plurality of times. The M frequency domain vectors in the first indication information may also be indicated by using a same field, need to be indicated only once, and do not need to be indicated for the plurality of polarization directions and/or the plurality of transport layers for a plurality of times.

In step 230, the terminal device sends the first indication information. Correspondingly, the network device receives the first indication information.

Specifically, the first indication information may be a PMI, or may be some information elements in the PMI, or may be other information. This is not limited in this application. The first indication information may be carried in one or more messages in the conventional technology and the terminal device sends the one or more messages to the network device, or the first indication information may be carried in one or more new messages designed in this application and the terminal device sends the one or more new messages to the network device. For example, the terminal device may send the first indication information to the network device by using a physical uplink resource such as a physical uplink shared channel (PUSCH) or a physical uplink control channel (PUCCH), so that the network device restores the precoding vector based on the first indication information.

A specific method for sending, by the terminal device, the first indication information to the network device by using the physical uplink resource may be the same as that in the conventional technology. For brevity, detailed description of a specific process thereof is omitted herein.

In step 240, the network device determines, based on the first indication information, a precoding vector corresponding to the one or more frequency domain units in each frequency domain unit group.

After receiving the first indication information, the network device may determine the spatial domain vector, the frequency domain vector, and the weighting coefficient that are fed back for each of the R frequency domain unit groups. A method for determining, by the network device, the spatial domain vector, the frequency domain vector, and the weighting coefficient based on the first indication information corresponds to the method for indicating, by the terminal device, the spatial domain vector, the frequency domain vector, and the weighting coefficient.

One frequency domain unit group is used as an example. If the terminal device indicates selected spatial domain vectors by using an index of a combination of the spatial domain vectors, the network device may determine the selected one or more spatial domain vectors from a spatial domain vector set based on the index and a plurality of predefined correspondences between an index and a combination of a plurality of spatial domain vectors.

If the terminal device indicates selected spatial domain vectors by using an index of each spatial domain vector, the network device may determine, from a spatial domain vector set based on the index, the one or more spatial domain vectors indicated by the terminal device. If the terminal device indicates selected frequency domain vectors by using an index of a combination of the frequency domain vectors, the network device may determine the selected one or more frequency domain vectors from a frequency domain vector set based on the index and a plurality of predefined correspondences between an index and a combination of a plurality of frequency domain vectors. If the terminal device indicates selected frequency domain vectors by using an index of each frequency domain vector, the network device may determine, from a frequency domain vector set based on the index, the one or more frequency domain vectors indicated by the terminal device.

If the terminal device indicates, by using a bitmap, a location of a space frequency vector pair corresponding to each weighting coefficient, the network device may determine, based on the bitmap and according to a predefined sequence of space frequency vector pairs, the space frequency vector pair corresponding to each weighting coefficient. If the terminal device indicates locations of selected space frequency vector pairs by using an index of a combination of a plurality of space frequency vector pairs, the network device may determine, based on a predefined correspondence between an index and a combination of a plurality of space frequency vector pairs, the combination of the plurality of space frequency vector pairs that corresponds to the index, to determine the selected space frequency vector pairs.

The R frequency domain unit groups may be predetermined by the network device.

Optionally, the method 200 further includes: Step 250. The network device determines the R frequency domain unit groups.

The network device may determine the R frequency domain unit groups from the reporting bandwidth. It should be understood that a specific method for determining, by the network device, the R frequency domain unit groups from the reporting bandwidth is the same as the specific method for determining, by the terminal device, the R frequency domain unit groups from the reporting bandwidth. The specific method for determining, by the terminal device, the R frequency domain unit groups has been described in detail in step 220 with reference to the accompanying drawings. Therefore, for brevity, details are not described herein again.

After determining the spatial domain vectors, the frequency domain vectors, and the weighting coefficients that respectively correspond to the R frequency domain unit groups, the network device may construct the precoding vector of the one or more frequency domain units in each frequency domain unit group based on the spatial domain vector, the frequency domain vector, and the weighting coefficient that correspond to each frequency domain unit group.

In a possible implementation, the network device may construct, based on the spatial domain vector, the frequency domain vector, and the weighting coefficient that are reported by the terminal device for each frequency domain unit group, a space frequency matrix H corresponding to the R frequency domain unit groups, where $H=[H_1 \ H_2 \ \ldots \ H_R]$. A space frequency matrix corresponding to the $r^{th}$ frequency domain unit group may be $H_r$, and $H_r = U_s C_r U_{f,r}^H$. Then, the space frequency matrix H corresponding to the R frequency domain unit groups may be represented as follows:

$$H = [H_1 \ H_2 \ \ldots \ H_R] = U_s[C_1 \ C_2 \ \ldots \ C_R]\begin{bmatrix} U_{f,1}^H & 0 & 0 & 0 \\ 0 & U_{f,2}^H & 0 & 0 \\ 0 & 0 & \ddots & 0 \\ 0 & 0 & 0 & U_{f,R}^H \end{bmatrix}.$$

$U_s$ represents a matrix constructed by using the foregoing L spatial domain vectors, and a dimension of the matrix may be $N_s \times L$. $U_{f,r}$ represents a matrix constructed by using the $M_r$ frequency domain vectors fed back for the $r^{th}$ frequency domain unit group, and a dimension of the matrix may be $N_{f,r} \times M_r$. $N_{f,r}$ represents a length of the frequency domain vector fed back for the $r^{th}$ frequency domain unit group, and $N_{f,r}$ is a positive integer. $C_r$ represents a matrix constructed by using the weighting coefficient fed back for the $r^{th}$ frequency domain unit group, and a dimension of the matrix may be $L \times M_r$. Therefore, a dimension of the space frequency matrix $H_r$ corresponding to the $r^{th}$ frequency domain unit group may be $N_s \times N_{f,r}$.

After determining the space frequency matrix corresponding to the R frequency domain unit groups, the network device may further determine the precoding vector corresponding to the one or more frequency domain units in each frequency domain unit group. For example, if the length $N_{f,r}$ of the frequency domain vector is determined based on a quantity of frequency domain units for which reporting is to be performed in the frequency domain unit group, in the space frequency matrix $H_r$ corresponding to the $r^{th}$ frequency domain unit group, a precoding vector corresponding to a $j^{th}$ frequency domain unit for which reporting is to be performed is a $j^{th}$ column in the space frequency matrix. If the length of the frequency domain vector is determined based on a quantity of frequency domain units in the frequency domain unit group, in the space frequency matrix $H_r$ corresponding to the $r^{th}$ frequency domain unit group, a precoding vector corresponding to a $j^{th}$ frequency domain unit is a $j^{th}$ column in the space frequency matrix, where j is a positive integer.

It should be understood that a form of the space frequency matrix H in the foregoing specification is merely an example, and should not constitute any limitation on this application. Alternatively, a space frequency matrix corresponding to each frequency domain unit group may be separately determined. This is not limited in this application.

It should be further understood that determining, by using the space frequency matrix, the precoding vector corresponding to the frequency domain unit is merely a possible implementation. Alternatively, the network device may directly determine, by using a formula, the precoding vector corresponding to the frequency domain unit. For example, the precoding vector $w_{j,r}$ corresponding to the $j^{th}$ frequency domain unit for which reporting is to be performed in the $r^{th}$ frequency domain unit group may be determined based on $$w_{j,r} = \frac{1}{P_{j,r}} \sum_{l=1}^{L} u_l \left( \sum_{m_r=1}^{M_r} a_{l,m_r} \bar{v}_{m_r}(j) \right) \cdot \frac{1}{P_{j,r}}$$

represents a normalization coefficient, and $$\frac{1}{P_{j,r}} > 0.$$

$u_l$ represents an $l^{th}$ spatial domain vector in the L spatial domain vectors. $v_{m_r}$ represents an $m_r^{th}$ frequency domain vector in the $M_r$ frequency domain vectors, and for example, the length of the frequency domain vector reported for the $r^{th}$ frequency domain unit group may be the quantity of frequency domain units for which reporting is to be performed. $v_{m_r}(j)$ represents a $j^{th}$ element in $v_{m_r}$, and $\bar{v}_{m_r}(j)$ represents a conjugate of $v_{m_r}(j)$, $a_{l,m_r}$ represents a weighting coefficient corresponding to the $l^{th}$ spatial domain vector $u_l$ and the $m_r^{th}$ frequency domain vector $v_{m_r}$.

It should be further understood that the foregoing specific method for determining, by the network device, the precoding vector corresponding to the frequency domain unit is described by using one polarization direction and one transport layer as an example, but this should not constitute any limitation on this application.

When the quantity of polarization directions of the transmit antenna is greater than 1, for example, the quantity of polarization directions is 2, the network device may determine, based on a method similar to that described in the foregoing specification, the precoding vector corresponding to the frequency domain unit. In this case, a dimension of the spatial domain vector may be change from $N_s$ to $2N_s$. Correspondingly, a dimension of the space frequency matrix corresponding to the $r^{th}$ frequency domain unit group may change from $N_s \times N_{f,r}$ to $2N_s \times N_{f,r}$.

When the quantity of transport layers is greater than 1, the network device may determine, based on a method similar to that described in the foregoing specification, the precoding vector corresponding to the frequency domain unit, and may extract a precoding vector corresponding to a same frequency domain unit at each transport layer, and for example, perform normalization processing, to obtain a precoding matrix corresponding to the same frequency domain unit. For a specific process of constructing, by the network device based on the precoding vectors of the same frequency domain unit at the plurality of transport layers, the precoding matrix corresponding to the frequency domain unit, refer to the conventional technology. For brevity, details are not described herein.

Therefore, in this embodiment of this application, the frequency domain units in the reporting bandwidth are grouped, and dual-domain compression is performed for each frequency domain unit group, to obtain frequency domain vectors and weighting coefficients that are respectively to be reported for a plurality of frequency domain unit groups. The frequency domain units are grouped and the frequency domain vector is determined based on each frequency domain unit group, so that the terminal device can construct, by using a frequency domain vector with a different length, a precoding vector corresponding to each frequency domain unit group. Therefore, the terminal device can determine a proper frequency domain vector length based on a quantity of frequency domain units for which reporting is to be performed in each frequency domain unit group and a distribution of the frequency domain unit, so that the determined frequency domain vector can better reflect a change law of a channel in frequency domain, to help to achieve relatively high feedback precision.

In contrast, if dual-domain compression is performed based on the entire reporting bandwidth, the terminal device needs to use frequency domain vectors with a same length to simulate a change law of a channel in frequency domain. In some cases, a distribution, of a frequency domain unit for which reporting is to be performed, in the reporting bandwidth may be discontinuous, or a quantity of frequency domain units for which reporting is to be performed is relatively small. If compression is performed by using a set of frequency domain vectors with a length the same as the quantity of frequency domain units for which reporting is to be performed, an obtained frequency domain vector cannot accurately reflect a change law of a channel in frequency domain due to poor continuity of the frequency domain unit for which reporting is to be performed. If compression is performed by using a frequency domain vector the same as the entire reporting bandwidth, relatively high overheads may be caused. Therefore, according to the precoding vector indicating and determining method provided in this application, relatively high feedback precision can be achieved in a case of equivalent overheads, to achieve higher efficiency of a compromise between feedback overheads and feedback precision.

It should be understood that sequence numbers of the processes do not mean execution sequences in the foregoing embodiments. The execution sequences of the processes should be determined according to functions and internal logic of the processes, and should not be construed as any limitation on the implementation processes of the embodiments of this application.

The foregoing describes, in detail with reference to FIG. 2 to FIG. 5, the precoding vector indicating and determining method provided in the embodiments of this application. The following describes, in detail with reference to FIG. 6 to FIG. 8, a communications apparatus provided in the embodiments of this application.

Figure 6:
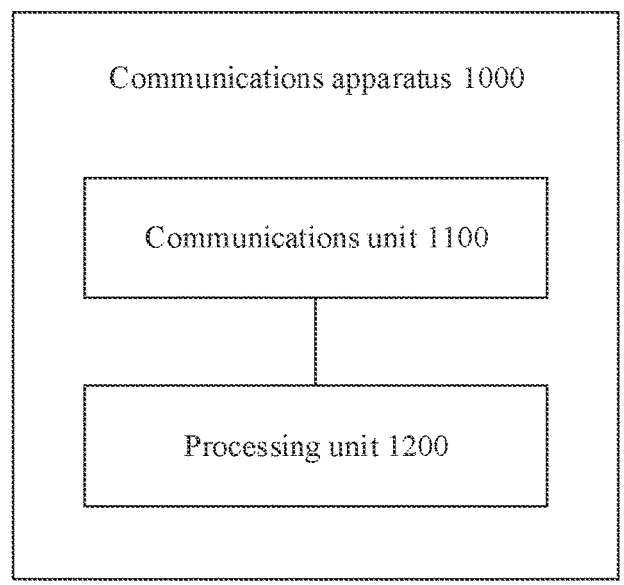
FIG. 6 is a schematic block diagram of a communications apparatus according to an embodiment of this application.

FIG. 6 is a schematic block diagram of a communications apparatus according to an embodiment of this application. As shown in the figure, the communications apparatus 1000 may include a communications unit 1100 and a processing unit 1200.

In a possible design, the communications apparatus 1000 may correspond to the terminal device in the foregoing method embodiment, for example, may be the terminal device or a chip configured in the terminal device.

Specifically, the communications apparatus 1000 may correspond to the terminal device in the method 200 according to the embodiments of this application, and the communications apparatus 1000 may include units configured to perform the method performed by the terminal device in the method 200 in FIG. 2. In addition, the units in the communications apparatus 1000 and the foregoing other operations and/or functions are respectively used to implement corresponding processes of the method 200 in FIG. 2.

When the communications apparatus 1000 is configured to perform the method 200 in FIG. 2, the communications unit 1100 may be configured to perform step 230 in the method 200, and the processing unit 1200 may be configured to perform step 210 and step 220 in the method 200. It should be understood that a specific process of performing, by each unit, the foregoing corresponding step has been described in detail in the foregoing method embodiment. For brevity, details are not described herein again.

Figure 7:
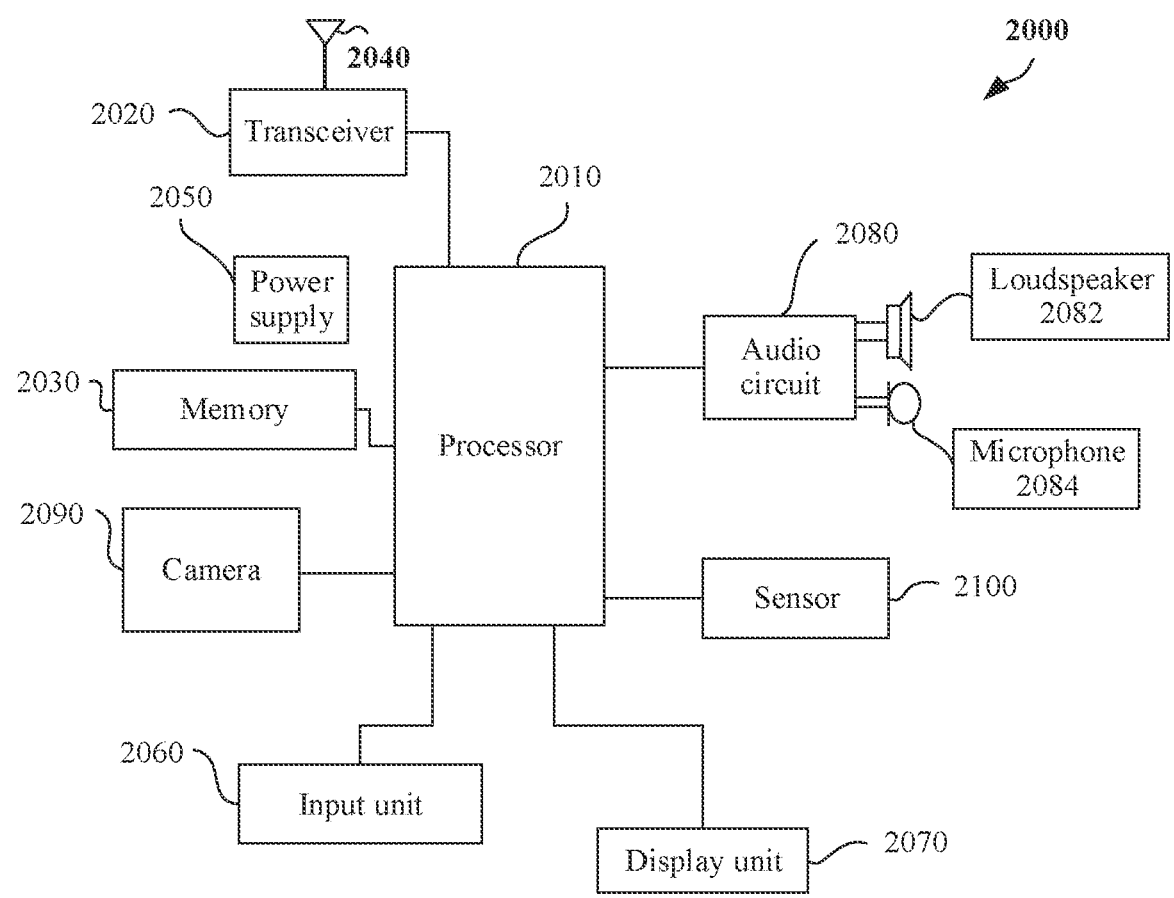
FIG. 7 is a schematic structural diagram of a terminal device according to an embodiment of this application.

It should be further understood that when the communications apparatus 1000 is the terminal device, the communications unit 1100 in the communications apparatus 1000 may correspond to a transceiver 2020 in a terminal device 2000 shown in FIG. 7, and the processing unit 1200 in the communications apparatus 1000 may correspond to a processor 2010 in the terminal device 2000 shown in FIG. 7.

It should be further understood that when the communications apparatus 1000 is the chip configured in the terminal device, the communications unit 1100 in the communications apparatus 1000 may be an input/output interface.

In another possible design, the communications apparatus 1000 may correspond to the network device in the foregoing method embodiment, for example, may be the network device or a chip configured in the network device.

Specifically, the communications apparatus 1000 may correspond to the network device in the method 200 according to the embodiments of this application, and the communications apparatus 1000 may include units configured to perform the method performed by the network device in the method 200 in FIG. 2. In addition, the units in the communications apparatus 1000 and the foregoing other operations and/or functions are respectively used to implement corresponding processes of the method 200 in FIG. 2.

When the communications apparatus 1000 is configured to perform the method 200 in FIG. 2, the communications unit 1100 may be configured to perform step 230 in the method 200, and the processing unit 1200 may be configured to perform step 240 and step 250 in the method 200. It should be understood that a specific process of performing, by each unit, the foregoing corresponding step has been described in detail in the foregoing method embodiment. For brevity, details are not described herein again.

Figure 8:
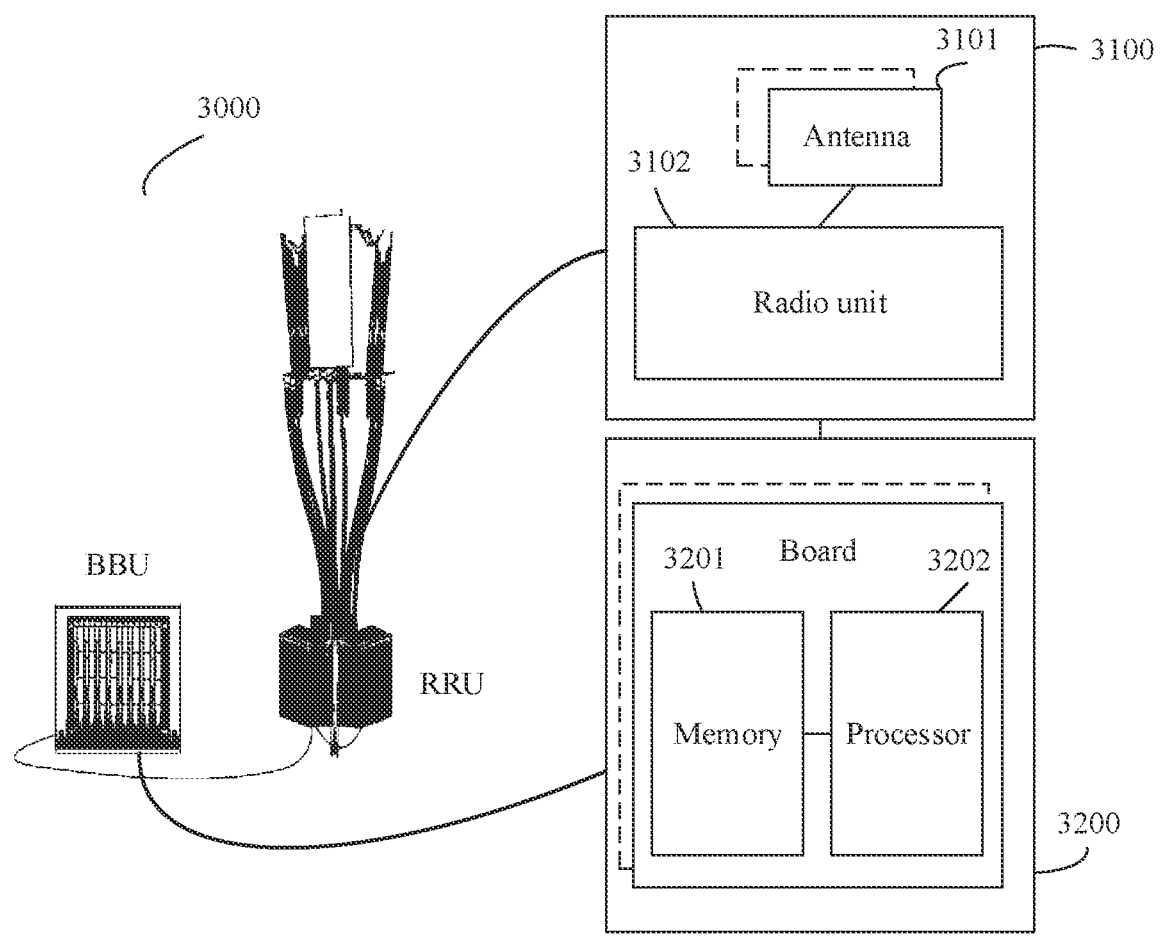
FIG. 8 is a schematic structural diagram of a network device according to an embodiment of this application.

It should be further understood that when the communications apparatus 1000 is the network device, the communications unit in the communications apparatus 1000 may correspond to a transceiver 3200 in a network device 3000 shown in FIG. 8, and the processing unit 1200 in the communications apparatus 1000 may correspond to a processor 3100 in the network device 3000 shown in FIG. 8.

It should be further understood that when the communications apparatus 1000 is the chip configured in the network device, the communications unit 1100 in the communications apparatus 1000 may be an input/output interface.

FIG. 7 is a schematic structural diagram of the terminal device 2000 according to an embodiment of this application. The terminal device 2000 may be applied to the system shown in FIG. 1, and performs functions of the terminal device in the foregoing method embodiment. As shown in the figure, the terminal device 2000 includes the processor 2010 and the transceiver 2020. Optionally, the terminal device 2000 further includes a memory 2030. The processor 2010, the transceiver 2020, and the memory 2030 may communicate with each other by using an internal connection path, to transfer a control signal and/or a data signal. The memory 2030 is configured to store a computer program. The processor 2010 is configured to invoke the computer program from the memory 2030 and run the computer program, to control the transceiver 2020 to transmit and receive signals. Optionally, the terminal device 2000 may further include an antenna 2040, configured to send, by using a wireless signal, uplink data or uplink control signaling output by the transceiver 2020.

The processor 2010 and the memory 2030 may be combined into one processing apparatus. The processor 2010 is configured to execute program code stored in the memory 2030, to implement the foregoing functions. During specific implementation, the memory 2030 may be alternatively integrated into the processor 2010, or may be independent of the processor 2010. The processor 2010 may correspond to the processing unit in FIG. 6.

The transceiver 2020 may correspond to the communications unit in FIG. 6, and may be alternatively referred to as a transceiver unit. The transceiver 2020 may include a receiver (or referred to as a receiver circuit) and a transmitter (or referred to as a transmitter circuit). The receiver is configured to receive a signal, and the transmitter is configured to transmit a signal.

It should be understood that the terminal device 2000 shown in FIG. 7 can implement various processes of the terminal device in the method embodiment of FIG. 2. Operations and/or functions of the modules in the terminal device 2000 are respectively used to implement the corresponding processes in the method embodiment. For details, refer to the descriptions of the foregoing method embodiment. To avoid repetition, detailed description is appropriately omitted herein.

The processor 2010 may be configured to perform the actions that are internally implemented by the terminal device in the foregoing method embodiment, and the transceiver 2020 may be configured to perform the actions of sending performed by the terminal device to the network device or receiving performed by the terminal device from the network device in the foregoing method embodiment. For details, refer to the descriptions of the foregoing method embodiment. Details are not described herein again.

Optionally, the terminal device 2000 may further include a power supply 2050, configured to supply power to various components or circuits in the terminal device.

In addition, to improve a function of the terminal device, the terminal device 2000 may further include one or more of an input unit 2060, a display unit 2070, an audio circuit 2080, a camera 2090, a sensor 2100, and the like. The audio circuit may further include a loudspeaker 2082, a microphone 2084, and the like.

FIG. 8 is a schematic structural diagram of a network device according to an embodiment of this application, for example, may be a schematic structural diagram of a base station. The base station 3000 may be applied to the system shown in FIG. 1, and performs functions of the network device in the foregoing method embodiment. As shown in the figure, the base station 3000 may include one or more radio units such as a remote radio unit (RRU) 3100, and one or more baseband units (BBU) (which may be alternatively referred to as a distributed unit (DU)) 3200. The RRU 3100 may be referred to as a transceiver unit, and corresponds to the communications unit 1200 in FIG. 6. Optionally, the transceiver unit 3100 may be alternatively referred to as a transceiver, a transceiving circuit, a transceiver, or the like, and may include at least one antenna 3101 and a radio unit 3102. Optionally, the transceiver unit 3100 may include a receiving unit and a sending unit. The receiving unit may correspond to a receiver (or referred to as a receiver circuit), and the sending unit may correspond to a transmitter (or referred to as a transmitter circuit). The RRU 3100 is mainly configured to receive and send radio frequency signals and perform conversion between a radio frequency signal and a baseband signal, and for example, is configured to send indication information to a terminal device. The BBU 3200 is mainly configured to perform baseband processing, control a base station, and the like. The RRU 3100 and the 1313U 3200 may be physically disposed together, or may be physically disposed separately, in other words, the base station is a distributed base station.

The BBU 3200 is a control center of the base station, may be alternatively referred to as a processing unit, may correspond to the processing unit 1100 in FIG. 6, and is mainly configured to implement a baseband processing function, for example, channel coding, multiplexing, modulation, and spreading. For example, the BBU (the processing unit) may be configured to control the base station to perform an operation process of the network device in the method embodiment, for example, generating the indication information.

In an example, the BBU 3200 may include one or more boards, and a plurality of boards together may support a radio access network (for example, an LTE network) of a single access standard, or may respectively support radio access networks (for example, an LTE network, a 5G network, or another network) of different access standards. The BBU 3200 further includes a memory 3201 and a processor 3202. The memory 3201 is configured to store necessary instructions and data. The processor 3202 is configured to control the base station to perform a necessary action, for example, configured to control the base station to perform an operation process of the network device in the method embodiment. The memory 3201 and the processor 3202 may serve one or more boards. In other words, a memory and a processor may be disposed on each board, or a plurality of boards may share a same memory and a same processor. In addition, a necessary circuit may be further disposed on each board.

It should be understood that the base station 3000 shown in FIG. 8 can implement various processes of the network device in the method embodiment of FIG. 2. Operations and/or functions of the modules in the base station 3000 are respectively used to implement the corresponding processes in the method embodiment. For details, refer to the descriptions of the method embodiment. To avoid repetition, detailed description is appropriately omitted herein.

The BBU 3200 may be configured to perform the actions that are internally implemented by the network device in the foregoing method embodiment, and the RRU 3100 may be configured to perform the actions of sending performed by the network device to the terminal device or receiving performed by the network device from the terminal device in the foregoing method embodiment. For details, refer to the descriptions of the foregoing method embodiment. Details are not described herein again.

An embodiment of this application further provides a processing apparatus, including a processor and an interface. The processor is configured to perform the precoding vector indicating and determining method in any method embodiment described above.

It should be understood that the processing apparatus may be a chip. For example, the processing apparatus may be a field programmable gate array (FPGA), an application specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory or an electrically erasable programmable memory, or a register. The storage medium is located in the memory, and a processor reads information in the memory and completes the steps in the foregoing methods in combination with hardware of the processor. To avoid repetition, details are not described herein again.

It should be noted that the processor in the embodiments of this application may be an integrated circuit chip and has a signal processing capability. In an implementation process, steps in the foregoing method embodiment can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware in the decoding processor and a software module. A software module may be located in a mature storage medium in the art, such as a random access memory, a flash memory, a read-only memory, a programmable read-only memory or an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory of the systems and methods described in this specification includes but is not limited to these and any memory of another proper type.

According to the method provided in the embodiments of this application, this application further provides a computer program product. The computer program product includes computer program code. When the computer program code is run on a computer, the computer is enabled to perform the method in the embodiment shown in FIG. 2.

According to the method provided in the embodiments of this application, this application further provides a computer readable medium. The computer readable medium stores program code. When the program code is run on a computer, the computer is enabled to perform the method in the embodiment shown in FIG. 2.

According to the method provided in the embodiments of this application, this application further provides a system, including one or more terminal devices and one or more network devices that are described above.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments completely correspond to the network device or the terminal device in the method embodiment, and corresponding modules or units perform corresponding steps. For example, a communications unit (transceiver) performs a receiving or sending step in the method embodiment. Other steps than sending and receiving may be performed by a processing unit (processor). For a specific function of a unit, refer to the corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process based on, for example, a signal having one or more data packets (for example, data from two components interacting with another component in a local system, in a distributed system, and/or across a network such as the Internet interacting with other systems by using the signal).

A person of ordinary skill in the art may be aware that, in combination with illustrative logical blocks described with reference to the embodiments disclosed in this specification and steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units are integrated into one unit.

All or some of the functions of each functional unit in the foregoing embodiments may be implemented by using software, hardware, firmware, or any combination thereof. When software is used to implement the embodiments, the embodiments may be implemented completely or partially in a form of a computer program product. The computer program product includes one or more computer program instructions. When the computer program instructions (programs) are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

When the functions are implemented in the form of a software functional unit and sold or used as an independent product, the functions may be stored in a computer-readable storage medium. Based on such an understanding, the technical solutions in this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A precoding vector indicating method, comprising:
generating first indication information, wherein the first indication information is used to indicate one or more frequency domain vectors and one or more weighting coefficients, wherein the one or more frequency domain vectors comprise a frequency domain vector reported for each of R frequency domain unit groups, wherein the one or more weighting coefficients comprise a weighting coefficient reported for each of the R frequency domain unit groups, wherein a frequency domain vector and a weighting coefficient that are reported for an $r^{th}$ frequency domain unit group in the R frequency domain unit groups are used to construct a precoding vector corresponding to one or more frequency domain units in the $r^{th}$ frequency domain unit group, wherein each of the R frequency domain unit groups comprises one or more frequency domain units, wherein 1≤r≤R, R≥2, and wherein both r and R are integers; and
sending the first indication information.

2. The method according to claim 1, wherein the method further comprises:
receiving second indication information, wherein the second indication information is used to indicate a quantity of to-be-reported frequency domain vectors that is configured for each of the R frequency domain unit groups.

3. The method according to claim 1, wherein the method further comprises:
receiving third indication information, wherein the third indication information is used to indicate a quantity of to-be-reported weighting coefficients that is configured for each of the R frequency domain unit groups.

4. The method according to claim 1, wherein:
the first indication information is further used to indicate a location of a space frequency vector pair corresponding to the weighting coefficient reported for each of the R frequency domain unit groups, wherein $K_r$ weighting coefficients are reported for the $r^{th}$ frequency domain unit group, wherein $K_r$ space frequency vector pairs corresponding to the $K_r$ weighting coefficients are selected from $L \times M_r$ space frequency vector pairs, wherein the $L \times M_r$ space frequency vector pairs are determined based on $M_r$ frequency domain vectors reported for the $r^{th}$ frequency domain unit group and L spatial domain vectors, wherein $M_r \geq 1$, $L \geq 1$, $K_r \leq L \times M_r$, and wherein all of $M_r$, L, and $K_r$ are integers; and
when being used to indicate locations of the $K_r$ space frequency vector pairs, the first indication information is used to indicate relative locations of the $K_r$ space frequency vector pairs in the $L \times M_r$ space frequency vector pairs.

5. The method according to claim 1, wherein:
the first indication information is further used to indicate locations of space frequency vector pairs corresponding to the weighting coefficients reported for the R frequency domain unit groups, wherein K weighting coefficients are reported for the R frequency domain unit groups, wherein space frequency vector pairs corresponding to the K weighting coefficients are selected from $L \times M$ space frequency vector pairs, wherein the $L \times M$ space frequency vector pairs are determined based on M frequency domain vectors reported for the R frequency domain unit groups and L spatial domain vectors, wherein $M \geq 1$, $L \geq 1$, $K \leq L \times M$, and wherein all of M, L, and K are integers; and when being used to indicate locations of the K space frequency vector pairs, the first indication information is used to indicate relative locations of the K space frequency vector pairs in the $L \times M$ space frequency vector pairs.

6. The method according to claim 1, wherein the first indication information is further used to indicate L spatial domain vectors, wherein a same spatial domain vector is reported for any two frequency domain unit groups in the R frequency domain unit groups, and wherein L is an integer greater than or equal to 1.

7. A precoding vector determining method, comprising:
receiving first indication information, wherein the first indication information is used to indicate one or more frequency domain vectors and one or more weighting coefficients, wherein the one or more frequency domain vectors comprise a frequency domain vector reported for each of R frequency domain unit groups, wherein the one or more weighting coefficients comprise a weighting coefficient reported for each of the R frequency domain unit groups, wherein a frequency domain vector and a weighting coefficient that are reported for an $r^{th}$ frequency domain unit group in the R frequency domain unit groups are used to construct a precoding vector corresponding to one or more frequency domain units in the $r^{th}$ frequency domain unit group, wherein each of the R frequency domain unit groups comprises one or more frequency domain units, wherein $1 \leq r \leq R$, $R \geq 2$, and wherein both r and R are integers; and determining, based on the first indication information, a precoding vector corresponding to the one or more frequency domain units in each of the R frequency domain unit groups.

8. The method according to claim 7, wherein the method further comprises:
sending second indication information, wherein the second indication information is used to indicate a quantity of to-be-reported frequency domain vectors that is configured for each of the R frequency domain unit groups.

9. The method according to claim 7, wherein the method further comprises:
sending third indication information, wherein the third indication information is used to indicate a quantity of to-be-reported weighting coefficients that is configured for each of the R frequency domain unit groups.

10. The method according to claim 7, wherein:
the first indication information is further used to indicate a location of a space frequency vector pair corresponding to the weighting coefficient reported for each of the R frequency domain unit groups, wherein $K_r$ weighting coefficients are reported for the $r^{th}$ frequency domain unit group, wherein $K_r$ space frequency vector pairs corresponding to the $K_r$ weighting coefficients are selected from $L \times M_r$ space frequency vector pairs, the $L \times M_r$ space frequency vector pairs are determined based on $M_r$ frequency domain vectors reported for the $r^{th}$ frequency domain unit group and L spatial domain vectors, wherein $M_r \geq 1$, $L \geq 1$, $K_r \leq L \times M_r$, and wherein all of $M_r$, L, and $K_r$ are integers; and when being used to indicate locations of the $K_r$ space frequency vector pairs, the first indication information is used to indicate relative locations of the $K_r$ space frequency vector pairs in the $L \times M_r$ space frequency vector pairs.

11. The method according to claim 7, wherein:
the first indication information is further used to indicate locations of space frequency vector pairs corresponding to the weighting coefficients reported for the R frequency domain unit groups, wherein K weighting coefficients are reported for the R frequency domain unit groups, wherein K space frequency vector pairs corresponding to the K weighting coefficients are selected from $L \times M$ space frequency vector pairs, wherein the $L \times M$ space frequency vector pairs are determined based on M frequency domain vectors reported for the R frequency domain unit groups and L spatial domain vectors, wherein $M \geq 1$, $L \geq 1$, $K \leq L \times M$, and wherein all of M, L, and K are integers; and when being used to indicate locations of the K space frequency vector pairs, the first indication information is used to indicate relative locations of the K space frequency vector pairs in the $L \times M$ space frequency vector pairs.

12. The method according to claim 7, wherein the first indication information is further used to indicate L spatial domain vectors, wherein a same spatial domain vector is reported for any two frequency domain unit groups in the R frequency domain unit groups, and wherein L is an integer greater than or equal to 1.

13. A communications apparatus, comprising:
at least one processor; and
one or more memories coupled to the at least one processor and storing programming instructions for execution by the at least one processor to perform operations comprising:
generating first indication information, wherein the first indication information is used to indicate one or more frequency domain vectors and one or more weighting coefficients, wherein the one or more frequency domain vectors comprise a frequency domain vector reported for each of R frequency domain unit groups, wherein the one or more weighting coefficients comprise a weighting coefficient reported for each of the R frequency domain unit groups, wherein a frequency domain vector and a weighting coefficient that are reported for an $r^{th}$ frequency domain unit group in the R frequency domain unit groups are used to construct a preceding vector corresponding to one or more frequency domain units in the $r^{th}$ frequency domain unit group, wherein each of the R frequency domain unit groups comprises one or more frequency domain units, wherein $1 \leq r \leq R$, $R \geq 2$, and wherein both r and R are integers; and
sending the first indication information.

14. The apparatus according to claim 13, wherein the operations further comprises receiving second indication information, wherein the second indication information is used to indicate a quantity of to-be-reported frequency domain vectors that is configured for each of the R frequency domain unit groups.

15. The apparatus according to claim 13, wherein the operations further comprises receiving third indication information, wherein the third indication information is used to indicate a quantity of to-be-reported weighting coefficients that is configured for each of the R frequency domain unit groups.

16. A communications apparatus, comprising:
at least one processor; and
one or more memories coupled to the at least one processor and storing programming instructions for execution by the at least one processor to perform operations comprising:
receiving first indication information, wherein the first indication information is used to indicate one or more frequency domain vectors and one or more weighting coefficients, wherein the one or more frequency domain vectors comprise a frequency domain vector reported for each of R frequency domain unit groups, wherein the one or more weighting coefficients comprise a weighting coefficient reported for each of the R frequency domain unit groups, wherein a frequency domain vector and a weighting coefficient that are reported for an $r^{th}$ frequency domain unit group in the R frequency domain unit groups are used to construct a preceding vector corresponding to one or more frequency domain units in the $r^{th}$ frequency domain unit group, wherein each of the R frequency domain unit groups comprises one or more frequency domain units, wherein $1 \leq r \leq R$, $R \geq 2$, and Wherein both r and R are integers; and
determining, based on the first indication information, a preceding vector corresponding to the one or more frequency domain units in each of the R frequency domain unit groups.

17. The apparatus according to claim 16, wherein the operations further comprises sending second indication information, wherein the second indication information is used to indicate a quantity of to-be-reported frequency domain vectors that is configured for each of the R frequency domain unit groups.

18. The apparatus according to claim 16, wherein the operations further comprises receiving sending third indication information, wherein the third indication information is used to indicate a quantity of to-be-reported weighting coefficients that is configured for each of the R frequency domain unit groups.

19. The apparatus according to claim 16, wherein:
the first indication information is further used to indicate a location of a space frequency vector pair corresponding to the weighting coefficient reported for each of the R frequency domain unit groups, wherein $K_r$ weighting coefficients are reported for the $r^{th}$ frequency domain unit group, wherein $K_r$ space frequency vector pairs corresponding to the $K_r$ weighting coefficients are selected from $L \times M_r$ space frequency vector pairs, the $L \times M_r$ space frequency vector pairs are determined based on $M_r$ frequency domain vectors reported for the $r^{th}$ frequency domain unit group and L spatial domain vectors, wherein $M_r \geq 1$, $L \geq 1$, $K_r \leq L \times M_r$, and wherein all of $M_r$, L, and $K_r$ are integers; and
when being used to indicate locations of the $K_r$ space frequency vector pairs, the first indication information is used to indicate relative locations of the $K_r$ space frequency vector pairs in the $L \times M_r$ space frequency vector pairs.

20. The apparatus according to claim 16, wherein:
the first indication information is further used to indicate locations of space frequency vector pairs corresponding to the weighting coefficients reported for the R frequency domain unit groups, wherein K weighting coefficients are reported for the R frequency domain unit groups, wherein K space frequency vector pairs corresponding to the K weighting coefficients are selected from $L \times M$ space frequency vector pairs, wherein the $L \times M$ space frequency vector pairs are determined based on M frequency domain vectors reported for the R frequency domain unit groups and L spatial domain vectors, wherein $M \geq 1$, $L \geq 1$, $K \leq L \times M$, and wherein all of M, L, and K are integers; and
when being used to indicate locations of the K space frequency vector pairs, the first indication information is used to indicate relative locations of the K space frequency vector pairs in the $L \times M$ space frequency vector pairs.

* * * * *

UNITED STATES PATENT AND TRADEMARK OFFICE
CERTIFICATE OF CORRECTION

PATENT NO. : 11,362,707 B2
APPLICATION NO. : 17/369513
DATED : June 14, 2022
INVENTOR(S) : Huangping Jin et al.

It is certified that error appears in the above-identified patent and that said Letters Patent is hereby corrected as shown below:

In the Claims

In Column 57, Line 10, in Claim 5, delete "wherein" and insert -- wherein K --.

In Column 58, Line 60, in Claim 13, delete "preceding" and insert -- precoding --.

In Column 59, Line 30, in Claim 16, delete "preceding" and insert -- precoding --.

In Column 59, Line 35, in Claim 16, delete "Wherein" and insert -- wherein --.

In Column 59, Line 38, in Claim 16, delete "preceding" and insert -- precoding --.

Signed and Sealed this
Fourth Day of April, 2023

Katherine Kelly Vidal
*Director of the United States Patent and Trademark Office*